US011034198B2

(12) United States Patent
Kadnikov et al.

(10) Patent No.: US 11,034,198 B2
(45) Date of Patent: Jun. 15, 2021

(54) TRAILER HITCH

(71) Applicant: ACPS Automotive GmbH, Markgroeningen (DE)

(72) Inventors: Aleksej Kadnikov, Leonberg (DE); Wolfgang Gentner, Steinheim (DE); Bernhard Rimmelspacher, Rheinstetten (DE)

(73) Assignee: ACPS Automotive GmbH, Markgroeningen (DE)

( * ) Notice: Subject to any disclaimer, the term of this patent is extended or adjusted under 35 U.S.C. 154(b) by 92 days.

(21) Appl. No.: 15/890,769

(22) Filed: Feb. 7, 2018

(65) Prior Publication Data
US 2018/0222263 A1    Aug. 9, 2018

(30) Foreign Application Priority Data
Feb. 8, 2017  (DE) .................... 10 2017 102 504.9

(51) Int. Cl.
*B60D 1/24* (2006.01)
*B60D 1/62* (2006.01)
(Continued)

(52) U.S. Cl.
CPC ............. *B60D 1/246* (2013.01); *B60D 1/06* (2013.01); *B60D 1/065* (2013.01); *B60D 1/54* (2013.01);
(Continued)

(58) Field of Classification Search
CPC .. B60D 1/246; B60D 1/065; B60D 2001/544; B60D 1/62; B60D 1/06
See application file for complete search history.

(56) References Cited

U.S. PATENT DOCUMENTS 5,853,186 A * 12/1998 Gentner .................. B60D 1/246
                                                           280/491.3
6,547,271 B2 * 4/2003 Kleb ........................ B60D 1/06
                                                           280/491.3
(Continued)

FOREIGN PATENT DOCUMENTS

DE    102010043964 A1    5/2012
DE    102011052433 A1    2/2013
(Continued)

OTHER PUBLICATIONS

English Translation of DE10201520499 (Year: 2015).*
Machine language English translation of DE 102015204900, obtained from www.espacenet.com on Oct. 9, 2019 (Year: 2016).*

*Primary Examiner* — Minnah L Seoh
*Assistant Examiner* — Harold Eric Pahlck, III
(74) *Attorney, Agent, or Firm* — Reinhart Boerner Van Deuren P.C.

(57) ABSTRACT

In order for a trailer hitch, comprising a bearing unit mountable on a rear end portion of a vehicle body, in fixed relation to the vehicle, said bearing unit having a bearing base and a ball neck carrier supported for movement on the bearing base, and further comprising a ball neck which at a first end is fixedly connected to the ball neck carrier and at a second end carries a hitch ball and which is movable, by the movement of the ball neck carrier relative to the bearing base, between two final positions, one of which is an operating position and the other one of which is a rest position, to be improved such that the position of the ball neck can be detected as simply and unambiguously as possible, it is proposed that a sensor system be provided for detecting the position of the ball neck relative to the bearing base, which sensor system detects the positions of the ball neck relative to the bearing base mounted in fixed relation to (Continued)

the vehicle and generates position information representative of the respective position of the ball neck.

41 Claims, 22 Drawing Sheets

(51) Int. Cl.
*B60D 1/06* (2006.01)
*B60D 1/54* (2006.01)

(52) U.S. Cl.
CPC .......... *B60D 1/62* (2013.01); *B60D 2001/544* (2013.01)

(56) References Cited

U.S. PATENT DOCUMENTS

| | | | | |
|---|---|---|---|---|
| 6,908,095 | B2* | 6/2005 | Reutlinger | B60D 1/54 |
| | | | | 280/491.3 |
| 6,997,472 | B2* | 2/2006 | Reutlinger | B60D 1/54 |
| | | | | 280/420 |
| 9,150,061 | B2* | 10/2015 | Riehle | B60D 1/248 |
| 9,744,821 | B2* | 8/2017 | Mutlu | B60D 1/065 |
| 9,744,822 | B2* | 8/2017 | Burkhardt | B60D 1/56 |
| 9,834,049 | B2* | 12/2017 | Strand | B60D 1/246 |
| 10,252,589 | B2* | 4/2019 | Sielhorst | B60D 1/06 |
| 10,406,872 | B2* | 9/2019 | Scheips | G01L 1/127 |
| 10,434,831 | B2* | 10/2019 | Rimmelspacher | B60D 1/52 |
| 2007/0007749 | A1* | 1/2007 | Gentner | B60D 1/26 |
| | | | | 280/491.1 |
| 2007/0138224 | A1* | 6/2007 | Rimmelspacher | B60D 1/26 |
| | | | | 224/519 |
| 2012/0130589 | A1 | 5/2012 | Riehle et al. | |
| 2013/0093162 | A1 | 4/2013 | Gentner | |
| 2019/0232739 | A1* | 8/2019 | Holz | B60D 1/06 |
| 2019/0270354 | A1* | 9/2019 | Angermann | B60D 1/065 |

FOREIGN PATENT DOCUMENTS

| | | | | |
|---|---|---|---|---|
| DE | 102011053506 | A1 | 3/2013 | |
| DE | 10 2012 216 798 | A1 | 3/2014 | |
| DE | 102013007726 | A1 | 11/2014 | |
| DE | 10 2015 204900 | A1 | 9/2016 | |
| DE | 102015204900 | A1 * | 9/2016 | ............... B60D 1/06 |
| DE | 102015108526 | A1 * | 10/2016 | ............... B60D 1/06 |
| EP | 2801487 | A1 | 11/2014 | |
| EP | 2829422 | A2 * | 1/2015 | |

* cited by examiner

TRAILER HITCH

CROSS-REFERENCE TO RELATED PATENT APPLICATION

This patent application claims the benefit of German application No. 10 2017 102 504.9, filed Feb. 8, 2017, the teachings and disclosure of which are hereby incorporated in their entirety by reference thereto.

BACKGROUND OF THE INVENTION

The invention relates to a trailer hitch, comprising a bearing unit mountable, in particular by way of a mounting unit, on a rear end portion of a vehicle body, in fixed relation to the vehicle, said bearing unit having a bearing base and a ball neck carrier supported for movement on the bearing base, and further comprising a ball neck which, at a first end thereof, is fixedly connected to the ball neck carrier and, at a second end thereof, carries a hitch ball and which is movable, by the movement of the ball neck carrier relative to the bearing base, between two final positions, one of which is an operating position in which the ball neck extends substantially in a vertical longitudinal center plane of the trailer hitch which, particularly in the state of being mounted to the vehicle body, is coincident with a vertical vehicle longitudinal center plane of the vehicle body, and the other one of which is a rest position in which the ball neck extends transversely with respect to the vertical longitudinal center plane of the trailer hitch.

Such trailer hitches are known in the art.

In such trailer hitches, the final position is conventionally detected by use of a push button that is associated with the final position or is associated with a pivotally blocking device which is effective in the final position.

These solutions have the drawback that, in some operating states, it is not possible to unambiguously detect the position of the ball neck.

Therefore, it is an object of the invention to improve a trailer hitch of the kind described at the outset such that the position of the ball neck can be detected as simply and unambiguously as possible.

SUMMARY OF THE INVENTION

In accordance with the invention, this object is achieved in a trailer hitch of the type described at the outset in that a sensor system is provided for detecting the position of the ball neck relative to the bearing base, which sensor system detects the positions of the ball neck relative to the bearing base mounted in fixed relation to the vehicle and generates position information representative of the respective position of the ball neck.

The advantage of the solution in accordance with the invention is seen in that it is now possible for the positions of the ball neck to be detected unambiguously and directly with the sensor system, without need for indirect detection of the respective position.

In the trailer hitch in accordance with the invention, it is in particular provided for the sensor system to detect at least one position range of the ball neck which encompasses the operating position and the rest position.

With this solution in accordance with the invention, it is at least possible to detect the position of the ball neck not only in the operating position directly or in the rest position directly but also in a position range that encompasses the operating position and the rest position and hence in a position range that also enables deviations from the respective final position to be detected.

For example, this solution makes it possible to recognize whether the respective final position has actually been reached or whether the ball neck is short of the final position owing to a disturbance, or to also detect whether the ball neck has moved out of and away from the respective final position by a slight pivotal movement thereof.

Preferably, the solution in accordance with the invention provides for the position range encompassing the respective final position to comprise the final position and a motion range reaching as far as this final position, which motion range encompasses deviations of the hitch ball from the final position of up to 5 mm for a translational movement and deviations from the final position of up to 10° for a rotational movement.

However, the solution in accordance with the invention may be used to particular advantage if the sensor system detects the locations of intermediate positions of the ball neck that lie between the operating position and the rest position so that it is also possible to check the movement through such intermediate positions between the operating position and the rest position.

The solution in accordance with the invention is particularly optimal if the sensor system detects the positions of the ball neck from the operating position to the rest position and vice versa.

For the detection of the positions, within the framework of the solution in accordance with the invention, it would in principle be sufficient for the individual positions to be detected in a certain position raster and hence not continuously; preferably, it is provided for the sensor system to detect the positions of the hitch ball relative to the bearing base with a spatial resolution of less than 8 mm for a translatory movement and/or a rotary movement.

More advantageously, the sensor system detects the positions of the hitch ball of the ball neck relative to the bearing base with a spatial resolution which is less than 2 mm for the case of translatory and/or rotary movements.

It is even more advantageous if the spatial resolution for the case of translatory and/or rotary movements is less than 1 mm.

A spatial resolution of less than 2 mm for the movements is understood to mean that the inaccuracy in the detection includes deviations from the actual value of a maximum of 2 mm. This corresponds approximately to a spatial resolution for rotary movements that is less than 5° and better still is 2°, wherein the measured value deviates from the actual value by less than 5° and 2° respectively.

In regard to the determination of the position information which provides information as to which of the final positions has been reached or which intermediate position has been reached relative to the final positions, for example which trajectory the hitch ball has already moved through starting from the one final position and which trajectory the hitch ball still has to move through until reaching the other final position, it is preferably provided for the sensor system to comprise an evaluation unit which compares the positions of the ball neck detected by the sensor unit with reference positions and thereby determines the position information.

Preferably, the reference positions are determined in the framework of a learning process and subsequently stored.

For example, the position information could be information relating to the movements of the ball neck carrier relative to the final positions.

However, it is particularly advantageous for the position information to provide information relating to the movements of the hitch ball relative to the final positions because the hitch ball is usually the part of the ball neck that is farthest from the bearing base and therefore has to move through the longest trajectories.

This solution then also affords the advantage that it provides a way of indicating, for example visualizing, the spatial area within which the ball neck moves from the one final position to the other final position, this providing important information to an operator, particularly for the case in which disturbances are created in the movement of the ball neck between the final positions, in particular by striking extraneous objects, for example external objects.

For example, in this connection, the reference values comprise position information on the final positions and thus, starting from the final positions, information concerning the path of travel which, starting from one of the final positions, has been moved through and/or is to be moved through for reaching the next final position, and/or information on the spatial area which, starting from the one final position has been moved through and/or is to be moved through for reaching the next final position, for the movement of the ball neck.

The evaluation unit is thus capable of generating the position information that provides unambiguous indication of the operating position and the rest position.

Furthermore, the evaluation unit is also capable of generating the position information that provides unambiguous indication of the intermediate positions lying between the final positions.

In a particularly advantageous solution, it is provided that the trailer hitch comprises at least one motorized drive unit for performing the movement of the ball neck and comprises a motion controller which cooperates with the evaluation unit and makes use of the position information for controlling the at least one drive unit and that the motion controller controls the drive unit taking into account the position information.

The advantage of this solution is seen in that, on the one hand, it is rendered possible, by virtue of the at least one motorized drive unit, to provide for motorized driving of the movement and for this motorized driving to be controlled via the motion controller which, on the basis of the position information made available to it by the evaluation unit, is able to identify the individual positions of the ball neck and to control, in a manner corresponding to the positions reached by the ball neck, the further movement thereof in a manner corresponding to the movement already performed or yet to be performed, in particular so that the safety requirements demanded for a motor vehicle can thereby be performed automatically by the motion controller.

For example, the solution in accordance with the invention provides for the motion controller to comprise a movement mode of operation in which the ball neck is moved from one of the final positions to the other final position.

In particular, such a control A provides that, for example, when the ball neck strikes an obstacle, the pivotal movement is interrupted and the ball neck is halted or is returned to the final position from where the movement originated.

Preferably, in such a movement mode of operation, provision is made for the motion controller to switch off the drive motor, driving the movement, of the at least one drive unit when the respective final position is reached as the conclusion of a process of entry into this final position.

It is thereby possible on the one hand to prevent overloading of the drive motor when the final position is reached and yet, on the other hand, to precisely reach the final position because the position of the ball neck can be detected when reaching the final position so that it is thereby also possible to preclude switching-off the drive motor before or immediately when the final position is finally reached.

The advantage of this solution is seen in that, as contrasted to the prior solutions, where the drive motor that drives the movement is switched off based on motor current, it is now possible for the actual reaching of the respective final position to be ascertained.

As contrasted to the use of motor current monitoring for switching off the drive motor, this results in that the reaching of the final position can definitely be detected and, thus, any disturbances which for example cause blocking before the final position is reached are precluded from causing switching-off of the drive motor and hence from causing stopping of the ball neck in a position that does not correspond to the final position.

A further advantageous solution provides for the motion controller in the movement mode of operation, in the course of moving the ball neck from the one final position to the other final position, to control the drive unit in such a manner that the drive unit moves the ball neck with a defined speed profile.

It is thereby possible for advantageous speed profiles to be predetermined for an optimum movement of the ball neck, which speed profiles optimize, for example, the time required for the movement from the one final position to the other final position and may also optimize the loads resulting therefrom on the bearing unit and the drive motor.

In the simplest solution, provision is made for the defined speed profile for the movement of the ball neck between the final positions to comprise a constant speed movement phase so that, for example, a lowering of the ball neck and a raising of the ball neck will not lead to different speeds.

Another advantageous solution provides that, as an alternative or in addition, the speed profile comprises acceleration phases and deceleration phases associated with the final positions.

A further solution provides that, as an alternative or in addition to the solutions heretofore described, the speed profile for a movement phase of the ball neck that presents an increased hazard potential to an operator, for example behind the motor vehicle, has a lower speed than that for movement phases that present no hazard potential, for example underneath the vehicle.

A further advantageous embodiment of the solution in accordance with the invention provides for the motion controller to monitor the movement of the ball neck and/or blocking of the movement by comparing the position information of the ball neck with a rotary movement signal of the drive motor of the at least one drive unit.

The advantage of this solution is seen in that it provides a way of establishing a correlation between the drive motor and the movement actually performed.

In particular, it is provided for the motion controller, by comparing the position information of the ball neck with the rotary movement signal of the drive motor, to determine a movement relationship and compare this with stored reference values for the movement relationship.

This provides a simple way of monitoring the movement of the ball neck for disturbances thereto.

For example, it is possible for the motion controller to generate a fault signal if the determined movement relationship deviates from the predetermined movement relationship.

Thus, said fault signal is generated for example when the motion controller ascertains a disturbance or movement of the ball neck due to external influences, such as a collision with an external object or the operator, or ascertains a disturbance in the area of the drive unit for the movement of the ball neck between the final positions.

In connection with the previous description of the trailer hitch in accordance with the invention, no details have been provided yet about whether and how a final position of the ball neck, in particular the operating position and the rest position, is to be blocked.

Therefore, in a particularly advantageous solution, it is provided that the trailer hitch comprises a blocking device for fixing the ball neck in the final positions and that the blocking device is transferable from a blocking position to a release position by way of a drive unit and that the motion controller which cooperates with the evaluation unit and makes use of the position information is provided for controlling the drive unit taking into account the position information.

Thus, the motion controller in accordance with the invention at the same time provides the possibility of controlling the drive unit for the blocking device in order to transfer same between its blocking position, in which the ball neck is fixed in the respective final position, to a release position in which the ball neck is able to move for reaching the respective other final position.

Said movement of the ball neck can be a translatory movement and/or a rotary movement.

Preferably, in an exemplary embodiment of the solution in accordance with the invention, it is provided that exiting the fixing position of the blocking device is made by translatory movement, followed by rotary movement to reach a position again whence the fixing position of the blocking device is again reached by translatory movement, wherein in the fixing position a transition to the blocking position of the blocking device takes place again, which blocking position exists, in particular, when the fixing position is preserved by a locking unit.

It is particularly advantageous for the motion controller in a movement mode of operation to control the drive unit in such a manner that the drive unit transfers the blocking device from the blocking position to the release position at the beginning of the movement.

Preferably, it is further provided for the motion controller in a movement mode of operation to control the drive unit in such a manner that the blocking device transitions to the blocking position no later than when the next following final position is reached.

This can be implemented, for example, by providing that the motion controller in the pivoting mode of operation, by controlling the drive unit, moves the blocking device to the blocking position when the next following final position is reached.

As an alternative to this, provision is made for the motion controller in the movement mode of operation, during the movement of the ball neck between the final positions, to move the blocking device to a blocking standby position from which the blocking device transitions to the blocking position automatically, for example under the action of a resilient force storage device.

This means that by way of the motion controller, it is possible to recognize that the ball neck still moves in an intermediate position prior to reaching the respective final position and, in this intermediate position, to transfer the blocking device to the blocking standby position, for example as shortly as possible before the final position is reached, so that the blocking device can then automatically transition to the blocking position when the final position is reached.

At the same time, the motion controller can in particular recognize to what extent the ball neck has moved, by a translatory movement following completion of the pivotal movement, to the respective final position in which the ball neck is fixed by the fixing unit, wherein this is for example a translatory movement that is detected by the sensor system.

No details of the configuration of the sensor system have been given in conjunction with the previously described individual exemplary embodiments.

For example, an advantageous solution provides for the sensor system to comprise a first sensor which is arranged for co-pivotal movement with the ball neck carrier or the ball neck and to comprise an evaluation unit connected to the first sensor, which evaluation unit, for determining the position of the ball neck, compares sensor signals of the first sensor with reference values associated with the respective position and thereby generates position information for the ball neck.

In a particularly advantageous solution, it is provided that the sensor system comprises a second sensor fixedly connected to the bearing base and that the evaluation unit is connected to the first sensor and the second sensor and detects the difference values between the first sensor and the second sensor and, for determining the position of the ball neck, compares these with stored reference values for the difference values associated with the respective position and thereby generates the position information for the ball neck.

For example, the reference values are determined in the framework of a learning process and subsequently stored.

This solution, comprising a second sensor, affords the possibility of eliminating movements of the bearing base that would represent additional disturbing influences from looking at the signals of the first sensor by themselves, thereby improving the precision with which the position of the ball neck is detected.

In particular, the first sensor and, where applicable, the second sensor are configured as sensors that detect their orientations and/or movements in space and which, in particular, do not require a reference to be provided on the trailer hitch for detecting the orientations and/or movements in space.

The use of such sensors is advantageous in that it provides a simple way of detecting complicated motions such as, in particular, multi-axis rotary and/or translatory movements which are executed simultaneously or one after the other.

By way of example, such sensors could be sensors that orient themselves to the Earth's magnetic field.

In particular, provision is made for the first sensor and the second sensor to be inclination sensors.

Such inclination sensors provide a simple way of detecting complicated movements of the ball neck on its way from the operating position to the rest position and vice versa.

In particular where the first sensor and the second sensor are inclination sensors, it is advantageous for difference values to be formed between these sensors because this allows inclinations of the bearing unit, in particular of the bearing base, which interfere with the detection of the inclination of the ball neck, to be applied as a correction.

It is thus possible to detect a relative inclination of the ball neck relative to the bearing base with high precision.

In particular, provision is made for the first sensor and the second sensor to be configured as sensors operable as inclination sensors detecting movements in space, for example acceleration sensors, so that the first sensor and the second sensor detect not only inclinations but inclinations and/or accelerations, whereby the detection of the movements in space can be improved further.

In particular, provision is made for the first sensor and/or the second sensor to detect inclinations about at least one inclination axis, i.e., a rotary axis.

Preferably, such inclination sensors configured as acceleration sensors are constructed in such a way that they are capable of detecting inclination values with respect to a direction of gravity so that the direction of gravity represents the reference direction for the detection of the inclination values and thus an identical reference is given by the direction of gravity for both the first and second sensors.

Preferably, the evaluation unit is configured such that it detects inclination difference values which are formed from inclination values as measuring values of the sensors, for determining the position information of the ball neck.

Furthermore, in order to obtain exact reference values, it is preferably provided for the evaluation unit to detect an inclination difference between an inclination of the first sensor and an inclination of the second sensor in at least one of the final positions.

Based on the detection of the inclination difference in one of the final positions, it is thus possible in the simplest case to leave the inclination value of the second sensor as a constant and, when the ball neck is moved, to form only the difference between the inclination values of the first sensor and the inclination value of the second sensor that is assumed to be constant.

In order to be able to follow the movement of the ball neck as accurately as possible, it is preferably provided that for determining the position information of the ball neck based on the determined inclination difference, the course of the inclination values of the first sensor is determined in a movement from one final position to the other final position.

In particular, the detection of the inclination values of at least the first sensor provides a simple way of detecting at least rotary movements of the ball neck relative to the bearing base about at least one pivot axis.

It is particularly advantageous for the detection of inclinations of the ball neck if the first sensor has its Z axis, which is relevant for inclination detection, and a further axis of its Cartesian coordinate system oriented in parallel relation to the pivoting plane so that movements around the pivot axis as an inclination axis can be detected with the first sensor in a simple way.

In order to simplify the forming of the difference between the inclination values of the first sensor and the second sensor, it is further advantageous for the second sensor to have its Z axis, which is relevant for inclination detection, and a further axis of its Cartesian coordinate system oriented in parallel relation to the pivoting plane so that the forming of the difference between the inclination values of the first sensor and the second sensor can be implemented in a simple manner, without conversion.

Furthermore, an advantageous solution provides for the evaluation unit to detect accelerations with at least one of the sensors, in particular the first sensor.

On the one hand, detecting the accelerations can be used to detect the inclination values even more precisely because accelerations also occur when inclinations occur.

As an alternative or in addition thereto, the detection of accelerations in particular also allows translatory movements of the ball neck to be detected so that this provides a simple way of detecting translatory movements of the ball neck additionally or alternatively to rotary movements.

It is particularly advantageous for the evaluation unit to detect accelerations with both sensors because this provides a way of eliminating disturbing parameters, particularly accelerations occurring in the area of the bearing base which interfere with the detection of the accelerations occurring only at the ball neck.

In particular, it is thereby possible for the evaluation unit to detect an acceleration difference between the first sensor and the second sensor and to detect rotary and/or translatory movements by determining difference values and, in particular, by comparing these with reference values.

The reference values are determined in the framework of a learning process, and these reference values are subsequently saved.

The detection of translatory movements by way of the evaluation unit can, for example, be carried out by detecting individual acceleration values over a time axis in conjunction with a time-course analysis in which the acceleration values determined over the time axis are evaluated in conjunction with the evaluation of the time intervals therebetween.

A particularly advantageous way of detecting the translatory movements provides for a course pattern analysis of the acceleration values detected over the time axis because the mechanical movement capabilities are predetermined by the movable support of the ball neck carrier and, consequently, at least similar, if not identical, course patterns of the acceleration values will occur during disturbance-free operation so that a comparison of the detected course pattern with a stored course pattern already provides information about disturbance-free or disturbance-laden operation.

Furthermore, it is particularly advantageous for the motion controller to have associated therewith a visualization unit for indicating operating modes and/or operating states and/or disturbances so that an operator can easily view the different modes and states.

The invention is particularly suitable for a trailer hitch comprising a mounting unit which is fixedly connectable to a vehicle body, a bearing unit provided on the mounting unit, said bearing unit having a bearing base which is fixedly connected to the mounting unit and having a ball neck carrier which is pivotable about a pivot axis, relative to the bearing base, between an operating position and a rest position and is displaceable in a direction of the pivot axis between a fixing position and a pivoting position, a ball neck which at one end thereof is held to the ball neck carrier and which at the other end thereof carries a hitch ball and which, by the pivoting capability of the ball neck carrier, is pivotable about the pivot axis between the operating position and the rest position and, by the displacement capability of the ball neck carrier, is displaceable between the fixing position and the pivoting position, a fixing unit which in the fixing position of the ball neck carrier fixes the ball neck carrier and thus also the ball neck relative to the bearing base in a rotationally fixed relation therewith by way of form-locking elements and in the pivoting position allows pivoting of the ball neck carrier, and a locking unit which acts axially against displacement in a direction of the pivot axis and by way of which the fixing unit, when in the fixing position, is fixable against movement in a direction of the pivoting position, wherein the fixing unit has a stationary first form-locking segment which is fixedly connected to the bearing base and with which, when in the operating position, a first form-locking segment which is connected to the ball neck carrier in a rotationally fixed relation therewith and is co-pivoted therewith, can be brought into engagement by displacing the ball neck carrier from the pivoting position to the fixing position and can be brought out of engagement by displacing the ball neck carrier from the fixing position to the pivoting position.

The advantage of this solution is seen in that it provides a simple, stable and practicable solution which, in particular, has small installation space requirements, for fixing the ball neck carrier relative to the bearing base.

Within the meaning of the solution in accordance with the invention, a form-locking-segment is understood to refer to a form-locking element which extends around the pivot axis.

In order to be able to implement fixing of the ball neck carrier also when in the rest position, it is preferably provided for the fixing unit to have a further first form-locking segment which is fixedly connected to the bearing base or is connected to the ball neck carrier in rotationally fixed relation therewith and with which, when in the rest position, the first form-locking segment which is connected to the ball neck carrier in rotationally fixed relation therewith and is co-pivoted therewith or which is fixedly connected to the bearing base respectively can be brought into engagement by displacing the ball neck carrier from the pivoting position to the fixing position and can be brought out of engagement by displacing the ball neck carrier from the fixing position to the pivoting position.

The advantage of this solution is seen in that it provides a simple possibility of fixing the ball neck carrier relative to the bearing base also when in the rest position.

To further improve the fixing of the ball neck carrier relative to the bearing base by way of the fixing unit, it is preferably provided for the fixing unit to have a stationary second form-locking segment which is fixedly connected to the bearing base and with which, when in the operating position, a second form-locking segment which is connected to the ball neck carrier in rotationally fixed relation therewith and is co-pivoted with the ball neck carrier can be brought into engagement by displacing the ball neck carrier from the pivoting position to the fixing position and can be brought out of engagement by displacing the ball neck carrier from the fixing position to the pivoting position.

The advantage of this solution is seen in that the second form-locking segment is thus also able to contribute to the fixing of the ball neck carrier relative to the bearing base.

In order to achieve fixing of the ball neck carrier relative to the bearing base by way of a plurality of interacting toothed segments also when in the rest position, it is preferably provided for the fixing unit to comprise a further second form-locking segment which is fixedly connected to the bearing base or is connected to the ball neck carrier in rotationally fixed relation therewith and with which, when in the rest position, the second form-locking segment which is connected to the ball neck carrier in rotationally fixed relation therewith and is co-pivoted with the ball neck carrier or which is fixedly connected to the bearing base can be being brought into engagement by displacing the ball neck carrier from the pivoting position to the fixing position and can be brought out of engagement by displacing the ball neck carrier from the fixing position to the pivoting position.

The advantage of this solution is seen in that this provides the possibility of fixing the ball neck carrier relative to the bearing base with respect to the pivot axis by way of form-locking segments also when in the rest position.

As an alternative or in addition to the previously described trailer hitch suitable for the invention, a further solution of a trailer hitch provides that the axially acting locking unit comprises a central receptacle carrier connected to the ball neck carrier for non-displacement in a direction of the pivot axis and co-movable with the ball neck carrier in a direction of the pivot axis, said central receptacle carrier having at least one locking receptacle located radially outwardly relative to the pivot axis, that the locking unit comprises at least one locking element arranged in a space around the receptacle carrier, said at least one locking element being capable of being brought into a locking position acting on the locking receptacle for holding same in the fixing position, that the locking unit comprises a guide carrier connected to the bearing base, said guide carrier having at least one guide for the at least one locking element, wherein the guide predetermines for the at least one locking element a direction of motion for a movement between the locking position and a releasing position, that the locking unit comprises an actuating element which acts on the at least one locking element from a side opposite to the receptacle carrier and that by way of the actuating element, a movement of the locking element from the releasing position to the locking position can be produced or a movement of the locking element from the locking position to the releasing position can be released.

The advantage of this solution is seen in that by the provision of the central receptacle carrier, a solution of simple structure is provided by way of which the ball neck carrier can be fixed in the fixing position, wherein the solution in accordance with the invention having the central receptacle carrier affords the advantage of requiring very small installation space.

The receptacle carrier can be configured in such a way that the locking element interacts with the locking receptacle only when in the locking position or just before reaching this position.

An advantageous solution provides for the locking receptacle to be provided with a pull-in surface upon which the locking element can act before reaching the locking position for pulling the receptacle carrier and hence the ball neck carrier into the fixing position.

It is particularly advantageous if the pull-in surface is extended far enough that the locking element is able to act on same in the releasing position, particularly if, in the releasing position, the pull-in surface is acted upon in a direction of the locking position so that by way of the locking element, it is possible to pull the receptacle carrier into the fixing position starting from the pivoting position and it is also possible, in the pivoting position, to have a pulling-in force act on the receptacle carrier.

For stable locking, it is preferably provided that the central receptacle carrier has at least two locking receptacles, that at least two locking elements are arranged in the space around the central receptacle carrier and that the guide carrier has at least two guides for the at least two locking elements.

It is thus possible for the receptacle carrier to be acted on, via the locking elements, by forces which act rotationally symmetrically or substantially rotationally symmetrically with respect to the pivot axis.

For example, it is possible for two locking elements to be arranged opposite to one another or for three locking elements to be arranged at an angular distance of 120° relative to one another.

It is particularly advantageous if the forces from the locking elements acting on the receptacle carrier substantially or completely cancel each other out so that the receptacle carrier is thereby easily held centrally with respect to the pivot axis, even when acted upon by the locking elements.

No details have been given so far in regard to the actuating element.

Thus, for example, it would be conceivable to arrange the actuating element for one or a plurality of locking elements in such a way that the actuating element is movable in a radial direction with respect to the pivot axis or in such a way that the actuating element is movable in a direction parallel to the pivot axis.

However, it is particularly advantageous, particularly in order to achieve small installation space requirements, for the actuating element to be rotatable about the pivot axis and to comprise at least one actuating surface sequence which comprises a radially outermost surface region and a radially innermost surface region and for the at least one locking element to be in its releasing position when it is in contact against the radially outermost surface region and to be in its locking position when it is in contact against the radially innermost surface region.

In the case of at least two locking elements, it is preferably provided that the actuating element radially outwardly surrounds the receptacle carrier and the at least two locking elements.

In particular, an advantageous solution provides for the actuating element to comprise an annular actuating surface carrier on which the at least one actuating surface sequence is arranged.

In principle, it would be conceivable to actively move the actuating element, for example by way of a drive.

In order to achieve a manually actuatable yet secure positioning of the actuating element, it is preferably provided for the actuating element to be continuously acted upon in a direction of its locking position by a spring force storage device. In particular, this has the advantage that when not being actuated, the locking unit automatically transitions from any position to the locking position, in particular to a clamping position thereof.

This solution has the advantage that movement of the actuating element in a direction of the releasing position must be accomplished against the action of the spring force storage device so that whenever the actuating element is not being actuated, the actuating element transitions automatically to the locking position and thus moves the locking elements into the locking receptacles so that the system always automatically transitions into a secure, namely, locked, state, provided that the ball neck carrier reaches the fixing position.

In order to ensure that the locking unit not only securely locks the ball neck carrier in the fixing position, but also causes the ball neck carrier to transition from the fixing position to the pivoting position when the locking unit is in its releasing position, it is preferably provided for the axially acting locking unit to comprise a push-out unit which acts axially in a direction of the pivoting position.

Such a push-out unit may be formed in a variety of ways.

The push-out unit preferably comprises a push-out element acting in a direction of the pivot axis, said push-out unit enabling the ball neck carrier to be displaceable from the fixing position to the pivoting position.

Such a push-out element is implemented, for example, in such a way that it acts, for example via an inclined surface, on a pressure-absorbing element that is coupled to the ball neck carrier.

In particular, it is provided that the push-out element together with the pressure-absorbing element moves the ball neck carrier from the fixing position to the pivoting position when the at least one locking element is able to reach its releasing position, that is, in particular, the actuating element is then in its releasing position.

In regard to the fixing of the movements of the locking element, it has been explained that the fixing is to be realized by way of the guide of the guide carrier.

No details have been given so far in regard to how the locking element is supported, particularly when in the locking position.

Thus, an advantageous solution provides that the locking element in the locking position is supported on the guide and can thus be urged into the locking receptacle while being supported on the guide in order to thus render it possible, in the locking position, to clamp the receptacle carrier relative to the guide carrier by way of the locking element so that the receptacle carrier can be clamped relative to the guide carrier by the locking element which is acted upon into its locking position by the actuating element.

No details have been provided yet as to how the guides on the guide carrier are configured.

In principle, it would be conceivable for the guide to be configured in such a way that it is implemented by a bore or a closed channel in the guide carrier.

A particularly advantageous solution, which is simplified in terms of manufacture and assembly in particular, provides for the at least one guide to be formed by a recess in the guide carrier.

Such a recess is for example of groove-like configuration and has side walls arranged opposite to one another and a recess bottom which guide the locking element, preferably in the intended direction of movement.

The recess is configured in such a way that the locking element in its locking position in which it engages in the locking receptacle is supported on a bottom of the recess and thus, in the locking position, on the one hand is in contact against the bottom of the recess and on the other hand is in contact against the locking receptacle and is additionally acted upon by the actuating element in a direction of the locking position.

It is thus possible to clamp the receptacle carrier relative to the guide carrier by urging the locking element into the locking receptacle while supporting the locking element on the bottom of the recess.

For the fabrication of the recess and the assembly of the bearing unit, it is particularly advantageous for the recess to be open on a side thereof facing away from the guide carrier.

No details have been provided yet as to how the guide carrier and the fixing unit are configured and connected together.

Thus, an advantageous solution provides for the guide carrier and a stationary form locking element carrier of the fixing unit to be connected together.

Furthermore, as an alternative or in addition to the solutions heretofore described, a further advantageous solution provides for the ball neck carrier to comprise a central pivot bearing body which is supported in a pivot bearing body receptacle of the bearing base radially outwardly surrounding the central pivot bearing body, for pivotal movement about the pivot axis and for displacement between the pivoting position and the fixing position in a direction of the pivot axis.

The provision of such a central pivot bearing body for pivotally supporting the ball neck carrier also has the advantage that it gives the possibility of a very small and space-conserving construction of the bearing unit because the pivot bearing body itself can be implemented in such a way that it is free of additional elements incorporated therein.

For example, with such a configuration of the bearing unit, provision may be made for the pivot bearing body to carry a central receptacle carrier of the axially acting locking unit having at least one locking receptacle, the central receptacle carrier being connected to the pivot bearing body for non-displacement in a direction of the pivot axis.

In this case, the locking unit can preferably be implemented in such a way that at least one locking element of the axially acting locking unit is arranged in a space around the receptacle carrier, said locking element being guided in a guide of a guide carrier which is supported on the bearing base and can be brought into engagement or out of engagement with the at least one locking receptacle by way of an actuating element arranged on a side of the locking element facing away from the receptacle carrier.

Such a solution is particularly compact and makes the locking unit easy to integrate in the bearing unit.

In this case, the pivot bearing body and the receptacle carrier are preferably fixedly connected to one another.

No details have been given as to the manner of actuating the trailer hitch in accordance with the invention.

For example, it is conceivable for the locking unit to be actuated by hand, in particular wherein a manual action is performed on the rotary driving element.

An advantageous solution provides for the locking unit to be actuatable by an actuating motor.

However, such actuation by an actuating motor is realized only in the sense that the locking unit is transferred to the releasing position, whereupon actuation with the actuating motor is ceased and the locking unit automatically transitions from the releasing position to the locking position again, in particular to the clamping position.

To this end, the locking unit is provided with a separate force storage device, in particular a spring force storage device, which generates force for producing the transition from the releasing position to the locking position, and the actuating motor then also acts against this force storage device in the transition from the locking position to the releasing position.

With such a solution, it is possible to provide an electrically actuatable trailer hitch coupling, for example wherein the ball neck can also be pivoted by hand.

As an alternative or in addition to the motorized actuation of the trailer hitch in accordance with the invention, provision is made for the ball neck carrier to be pivotable between the driving position and the operating position by way of a pivoting motor so that in this case manual pivoting is no longer necessary and instead this pivoting is carried out by the pivoting motor, which, however, is required only for the pivotal movement.

Further features and advantages of the invention are the subject matter of the following description and the drawings illustrating some exemplary embodiments thereof.

DETAILED DESCRIPTION OF THE INVENTION

Figure 1:
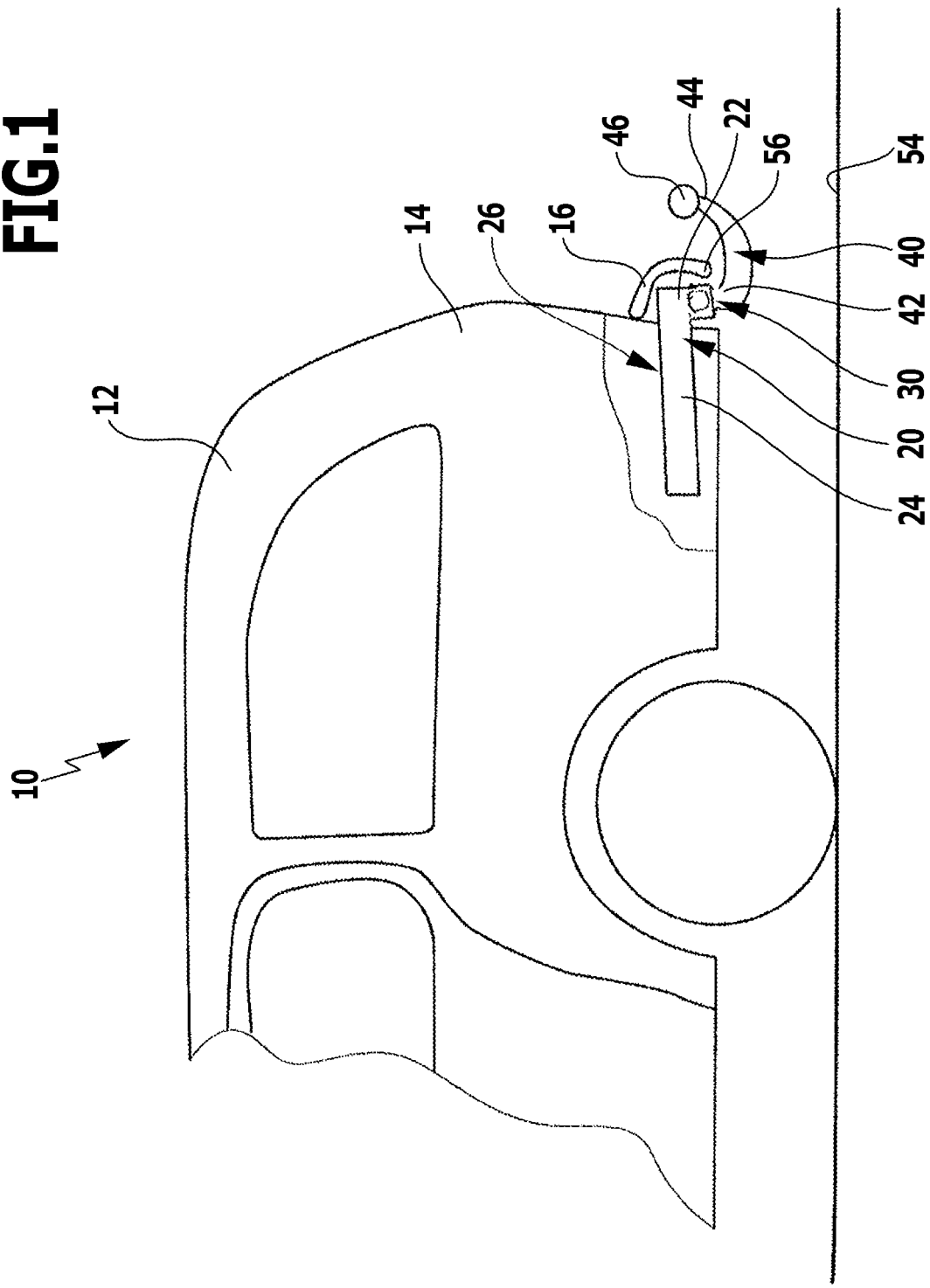
FIG. 1 shows a side view of a motor vehicle, partially cut away in a rear end portion thereof, comprising a trailer hitch in accordance with the invention.

A motor vehicle shown in FIG. 1, designated generally at 10, comprises a vehicle body 12 which has mounted thereon, in a rear end portion 14 thereof, a trailer hitch 20 in accordance with the invention, said trailer hitch 20 having a cross member 22 which is covered by a bumper unit 16 and extends transversely with respect to a longitudinal direction of the vehicle body 12 and transversely with respect to the rear end portion 14, and having side members 24 extending in a longitudinal direction of the vehicle body 12 along body wall sections and being fixed thereto, said side members 24 together with the cross member 22 forming a mounting unit 26 which is covered in part by the vehicle body 12 and in part by the bumper unit 16.

Figure 2:
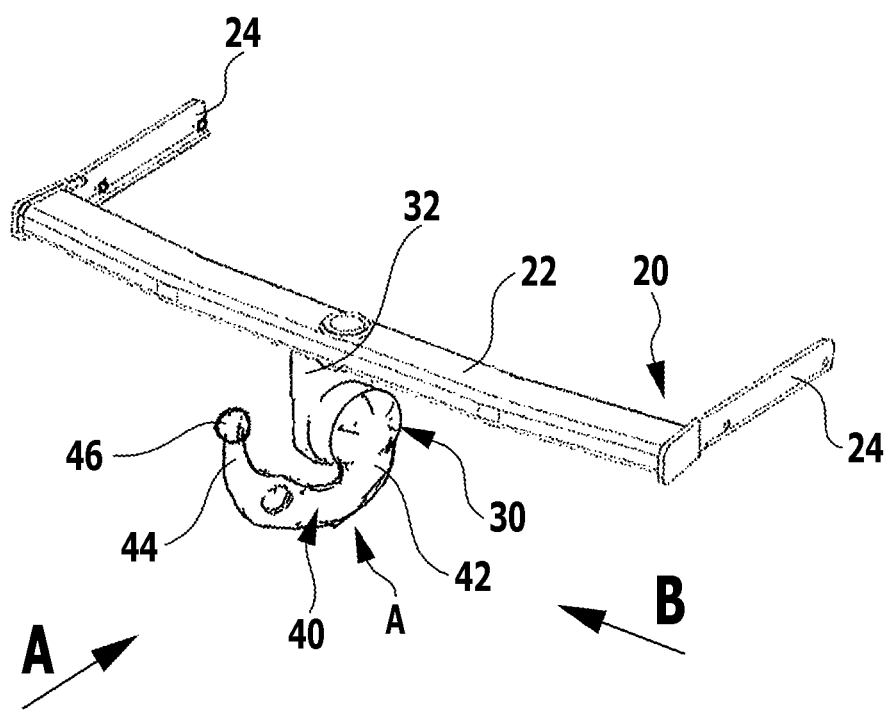
FIG. 2 shows a perspective representation of a trailer hitch in accordance with the invention, comprising a mounting unit, a bearing unit and a ball neck pivotably connected to the mounting unit by the bearing unit.

Provided on the mounting unit 26 is a mounting plate 32 of a bearing unit, indicated generally at 30, with which is connected a ball neck, designated generally at 40, at a first end 42 thereof, which ball neck 40 carries, at a second end 44 thereof, a hitch ball generally designated at 46, as depicted in FIGS. 1 and 2.

Figure 3:
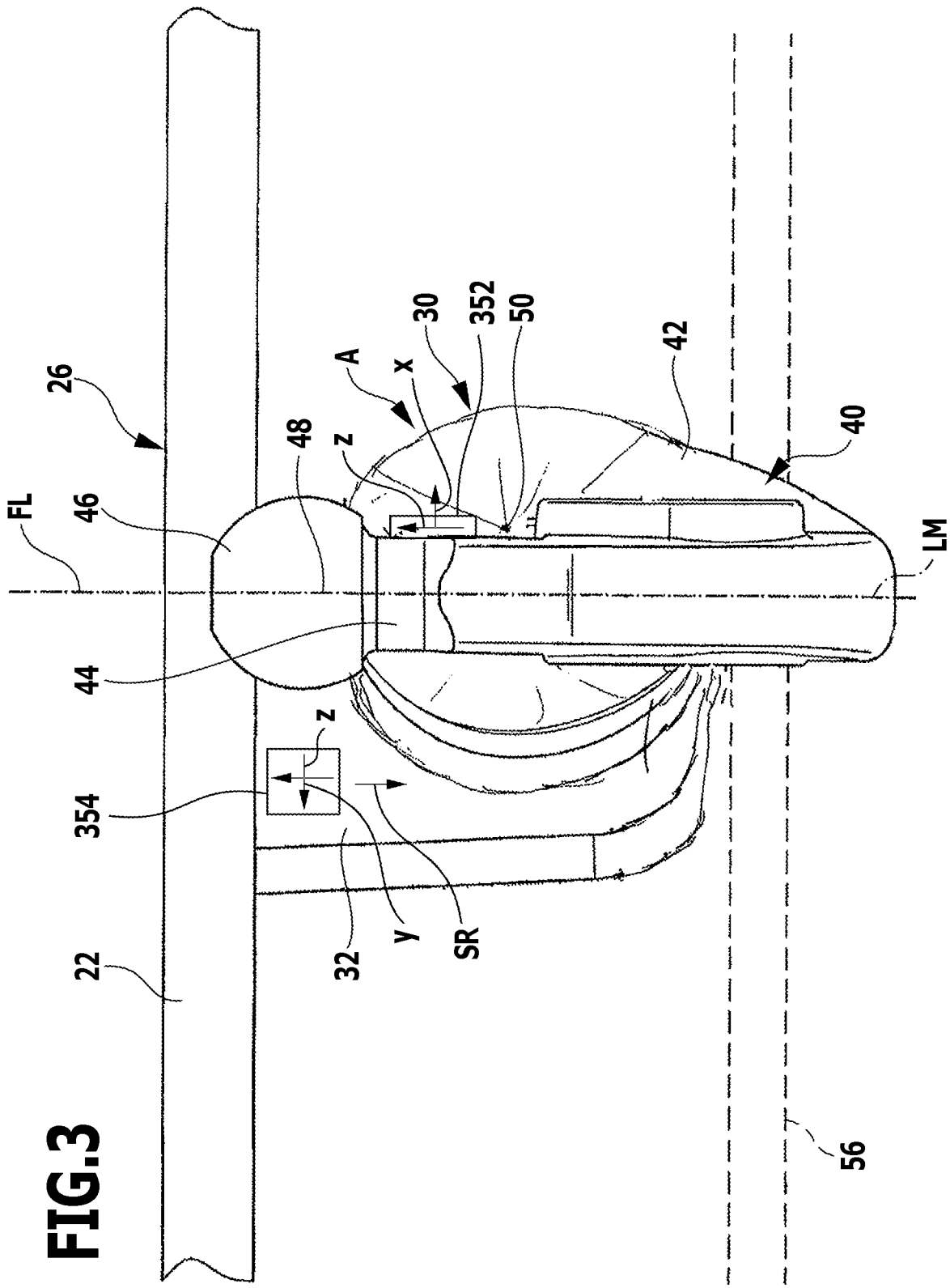
FIG. 3 shows an enlarged view, taken in the direction of arrow A in FIG. 2, of the trailer hitch in accordance with the invention, illustrating an operating position.
Figure 4:
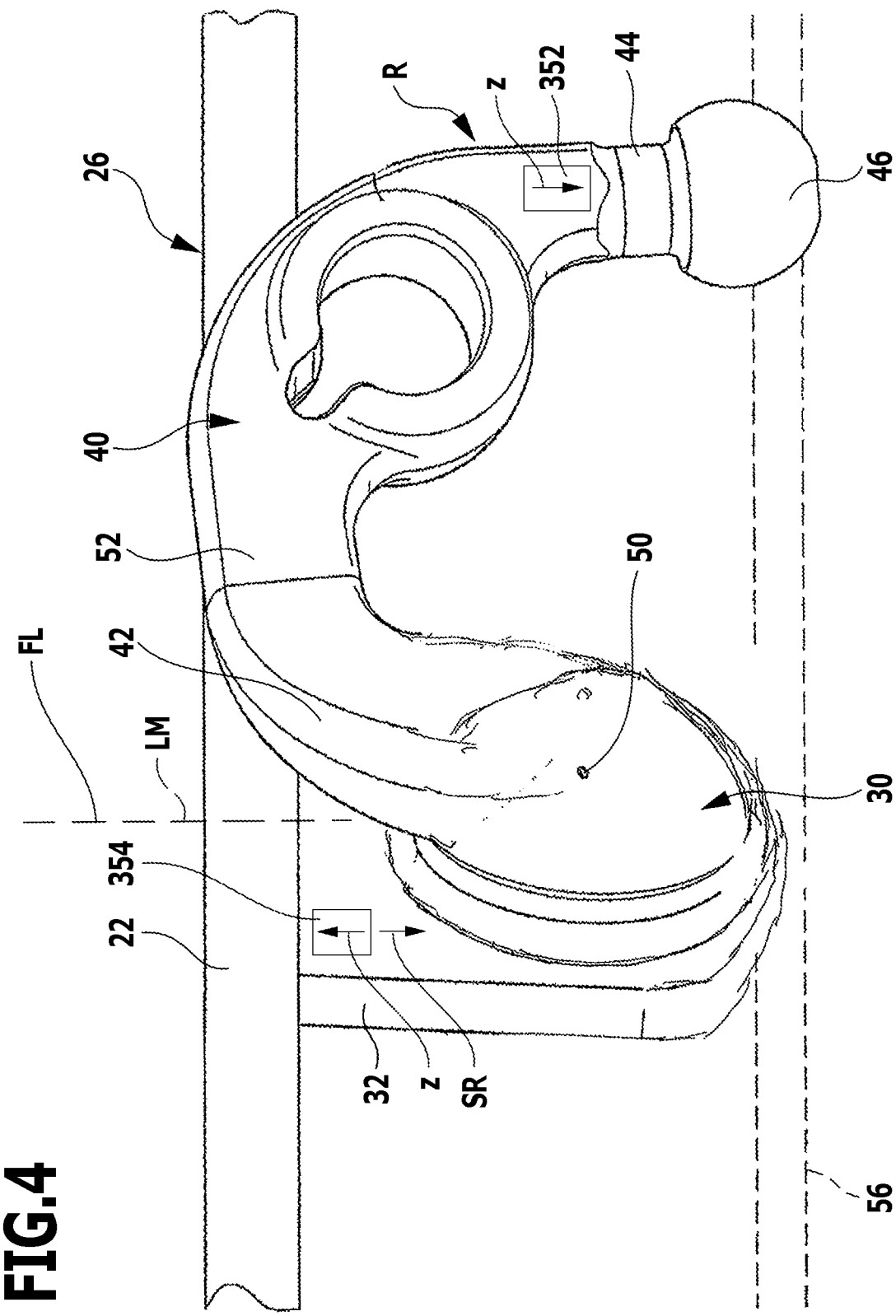
FIG. 4 shows a view corresponding to FIG. 3 but illustrating a rest position.

By way of the bearing unit 30, it is possible for the ball neck 40 to be pivoted, from an operating position A, illustrated in FIGS. 2 and 3, in which a ball center axis 48 of the hitch ball 46 lies in a longitudinal center plane LM of the trailer hitch 20 coincident with the vehicle longitudinal center plane FL, about a pivot axis 50 running transversely, in particular obliquely, preferably at an acute angle, relative to the vehicle longitudinal center plane FL, to a rest position R, illustrated in FIG. 4, in which a central section 52 of the ball neck extends transversely with respect to the vehicle longitudinal center plane FL and the hitch ball 46 lies to the side of the vehicle longitudinal center plane FL (FIG. 4).

Preferably, the ball neck 40 in the rest position R is arranged in a position in which it is covered by the bumper unit 16 of the vehicle body 12 and lies to the side of the vehicle longitudinal center plane FL, and—depending on the orientation of the pivot axis 50—the ball neck 40 is located on a side of the hitch ball 46 facing away from a roadway 54 or the ball neck 40 is located at a position spaced from the roadway 54 by at least such a distance that it is located higher from the roadway 54 than is a lower edge 56 of the bumper unit 16.

Figure 5:
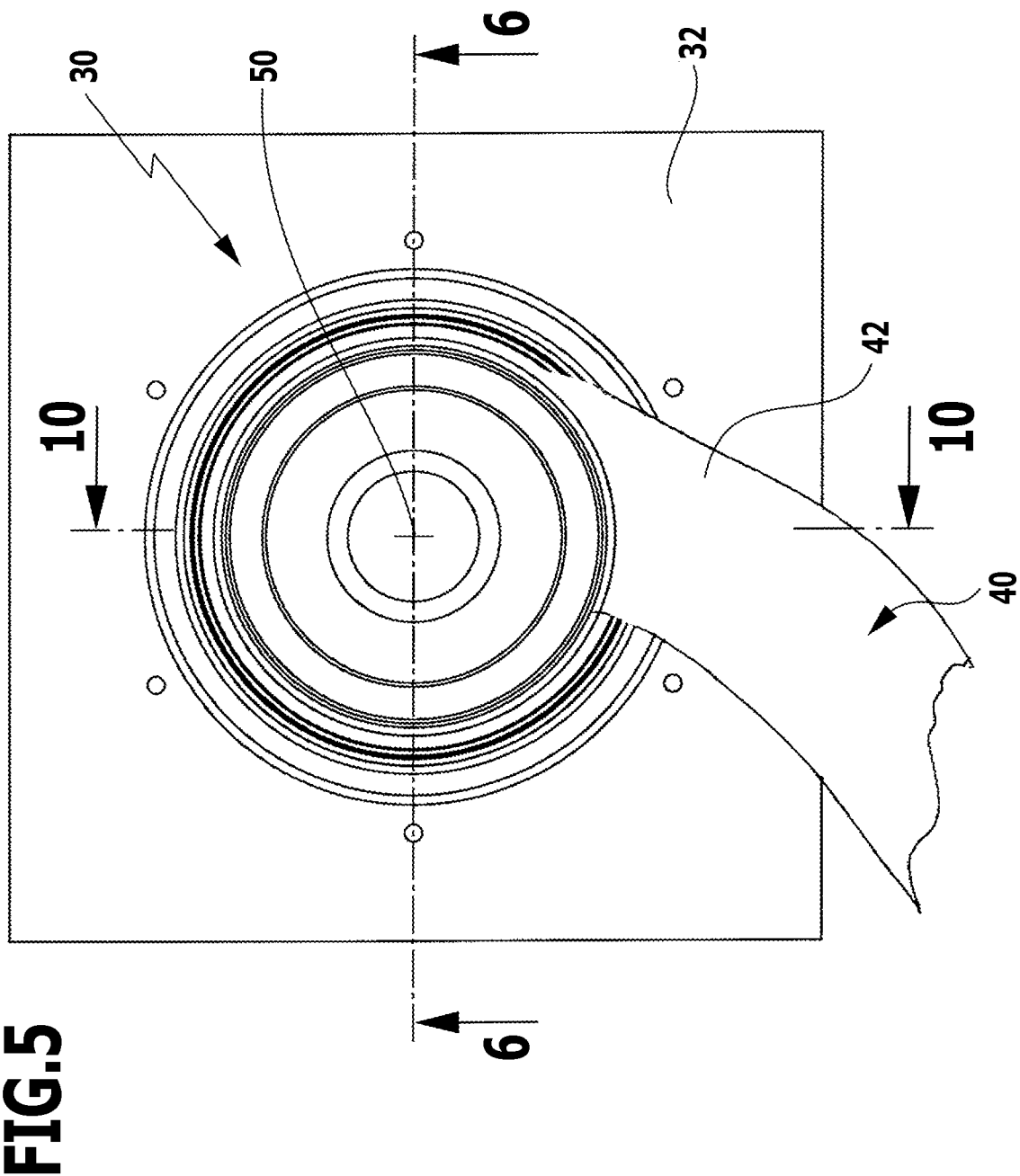
FIG. 5 shows a top view of the trailer hitch in accordance with the invention, taken in the direction of arrow B in FIG. 2.
Figure 6:
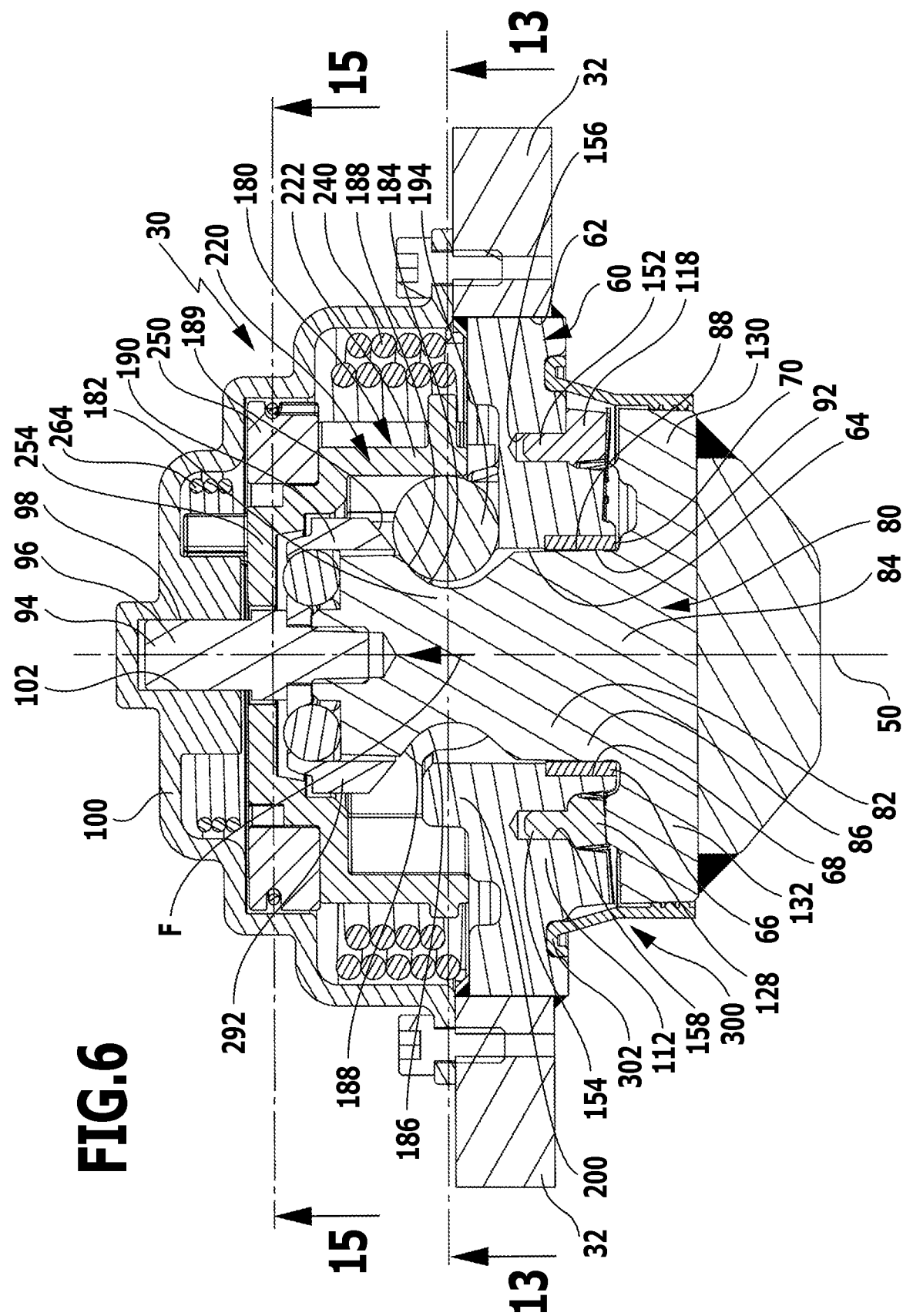
FIG. 6 shows a section, taken along line 6-6 of FIG. 5, through the bearing unit in its fixing position.
Figure 7:
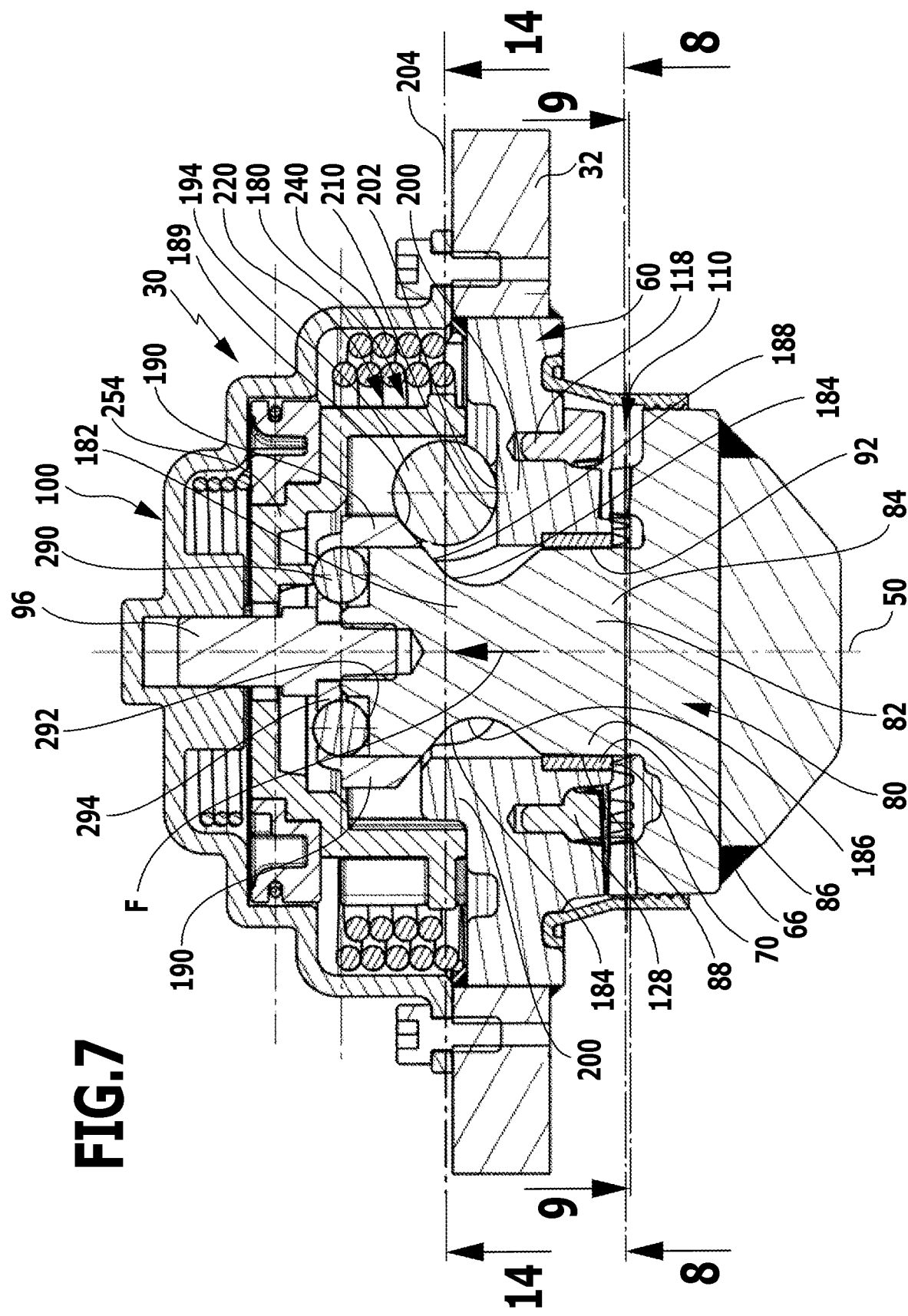
FIG. 7 shows a section, taken along line 6-6 of FIG. 5, through the bearing unit in its pivoting position.

As shown in FIGS. 5 to 7, the bearing unit generally designated at 30 is for example arranged on the mounting plate 32 of the mounting unit 26 in such a manner that the pivot axis 50 runs perpendicularly with respect to the mounting plate 32, for example wherein the bearing unit 30 in accordance with the invention extends on either side of the mounting plate 32.

However, it is also possible for the bearing unit 30 to be directly connected to the mounting unit 26.

The bearing unit 30 in accordance with the invention comprises a bearing base 60 which is for example inserted in an opening 62 of the mounting plate 32 and is connected to the mounting plate 32 by use of joining techniques and which forms a central passage 64 which, at least in a section thereof, is surrounded by a pivot bearing body receptacle 66 formed as a sleeve.

Preferably, the pivot bearing body receptacle 66 formed as a sleeve is located in a recess 68 which is integrally formed in the bearing base 60 and receives the pivot bearing body receptacle 66, and adjoins a front side 70 of the bearing base 60.

A ball neck carrier 80 is pivotable, relative to the bearing base 60, about the pivot axis 50 and has a pivot bearing body 82 which engages in the passage 64 and extends through the passage 64 of the bearing base 60.

In the area of an outer end 84, the pivot bearing body 82 comprises an outer bearing section 86 which carries cylindrical outer guide surfaces 88 which cooperate with cylindrical guide surfaces 92 of the pivot bearing body receptacle 66 so that the cylindrical guide surfaces 88 and 92 are arranged coaxially with respect to the pivot axis 50 and form an outer pivot support for the pivot bearing body 82.

Starting from the outer end 84, the pivot bearing body 82 extends through the passage 64 and forms, at an inner end 94 thereof, an inner bearing section 96 configured in the form of a pin, said inner bearing section 96 carrying cylindrical inner guide surfaces 98 which together with cylindrical guide surfaces 102 form an inner pivot support which is coaxially rotatable about the pivot axis 50, wherein the guide surfaces 102 are arranged on a housing body 100 that is fixedly connected to the mounting plate 32 and is thus also fixedly connected to the bearing base 60.

As depicted in FIGS. 6 and 7, the ball neck carrier 80 is displaceable in a direction of the pivot axis from a fixing position shown in FIG. 6 to a releasing position shown in FIG. 7, wherein, when in the releasing position, the ball neck carrier 80 is displaced in a direction of the pivot axis 50 such that the outer end 84 of the pivot bearing body 82 protrudes at least partially beyond the front side 70 of the bearing base 60, i.e., such that the pivot bearing body 82 as a whole is displaced in a direction of the front side 70.

However, in the pivoting position, the pivot bearing body 82 is also guided in the guide surface 102, coaxially with respect to the pivot axis 50, by the inner bearing portion 96 comprising the inner guide surface 98, and in addition is guided in the guide surface 92 of the pivot bearing body receptacle 66, coaxially with respect to the pivot axis 50, by the outer bearing portion 86 comprising the outer guide surface 88.

In this way, the bearing unit 30 in accordance with the invention allows for both pivoting of the ball neck carrier 80 and displacement of the ball neck carrier 80 in a direction of the pivot axis 50, wherein the pivot bearing body 82 receives guidance for rotation about the pivot axis 50 both in the fixing position and in the pivoting position.

Preferably, the outer guide surface 88 has a larger diameter than the inner guide surface 98 and is guided in the corresponding guide surface 92 by a diameter that is larger than that with which the inner guide surface 98 is guided in the guide surface 102 so that the outer pivot support formed by the outer guide surface 88 and the guide surface 92 is able to absorb larger forces than the inner pivot support formed by the inner guide surface 98 and the guide surface 102, in particular wherein the inner pivot support primarily represents guidance against tilting of the outer guide surface 88 in the guide surface 92 of the outer pivot support.

A fixing unit, designated generally at 110, is provided for a rotationally fixed fixing of the ball neck carrier 80 relative to the bearing base 60.

Figure 8:
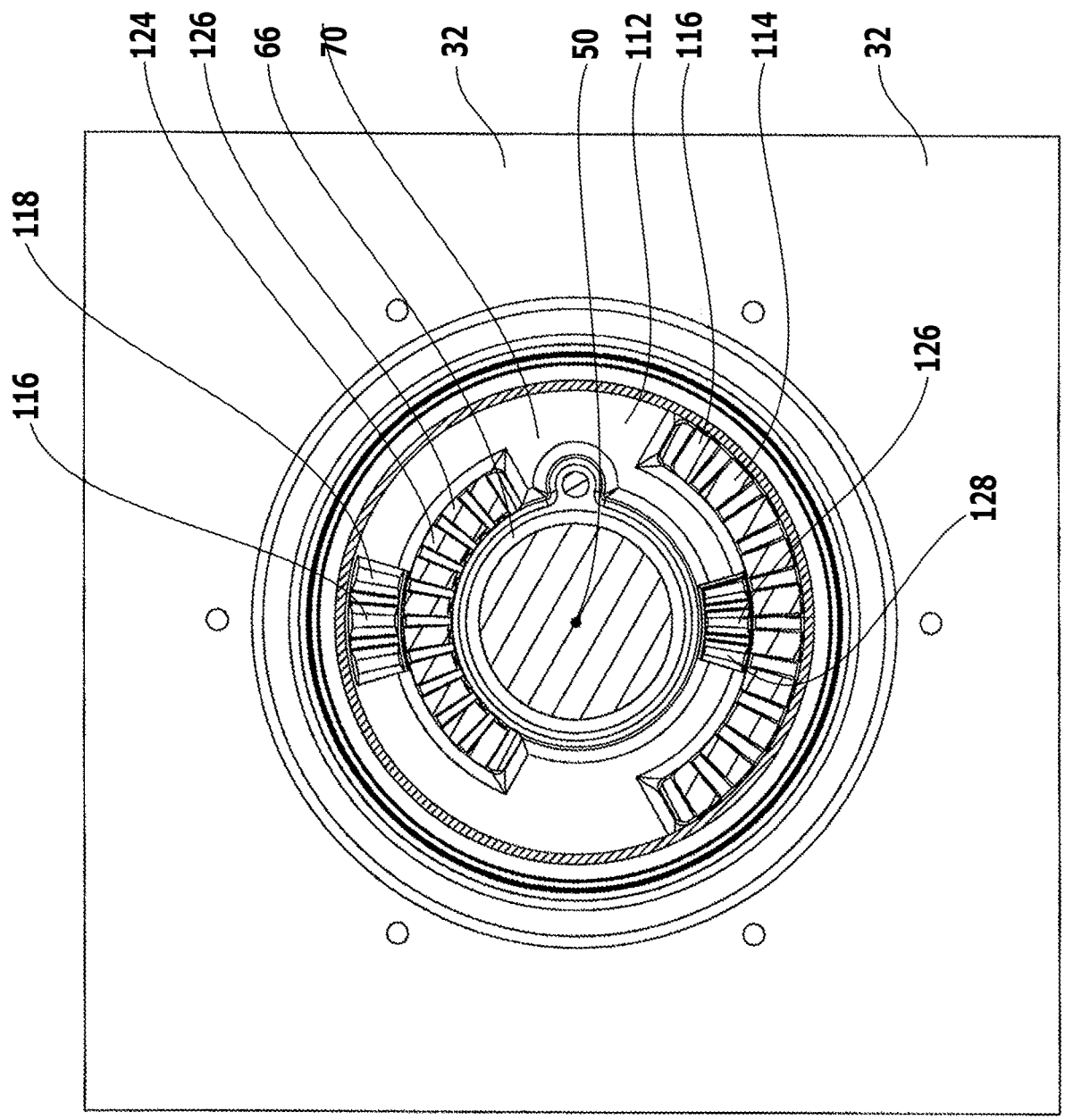
FIG. 8 shows a section along line 8-8 of FIG. 7.

As illustrated in FIGS. 6 and 8, said fixing unit 110 comprises a form locking element carrier 112 arranged radially outside the pivot bearing body receptacle 66 and forming the front side 70 of the bearing base 60, said form locking element carrier 112 comprising, as a form-locking element, a radially outer first toothed segment 114 having first teeth 116 which rise above the front side 70, wherein the first toothed segment 114 is provided with a multiplicity of the first teeth 116 which extend around the pivot axis 50, for example over an arc segment of greater than 90°, for example an arc segment of up to 120°.

Furthermore, the form locking element carrier 112 has provided thereon a further first toothed segment 118 as a form-locking element which likewise has first teeth 116, but only a few first teeth, for example three such first teeth 116, so that the further first toothed segment extends only over an arc section that is substantially smaller than the arc section of the first toothed segment.

The two first toothed segments 114 and 118 extend about the pivot axis 50 at the same radial distance.

Furthermore, provided on the form locking element carrier 112, for example at a position opposite to the first toothed segment 114, is a radially inner second toothed segment 124 which is for example arranged between the radially outer further first toothed segment 118 and the pivot bearing body receptacle 66, on the front side 70.

This second toothed segment 124 also has a multiplicity of second teeth 126 and extends over an arc section of greater than 90°, preferably over an arc section having an extent which corresponds approximately to that of the first toothed segment 114.

A further second toothed segment 128 is provided on the form locking element carrier 112 at a position opposite to the second toothed segment 124, preferably between the first toothed segment 114 and the pivot bearing body receptacle 66, which further second toothed segment 128 also has second teeth 126 but extends over a considerably smaller arc section than the second toothed segment 126 and comprises, for example, three second teeth 126.

The two second toothed segments 124, 128 extend about the pivot axis 50 at the same radial distance, which distance, however, is smaller than the radial distance of the first toothed segments 124, 128 from the pivot axis 50.

Figure 9:
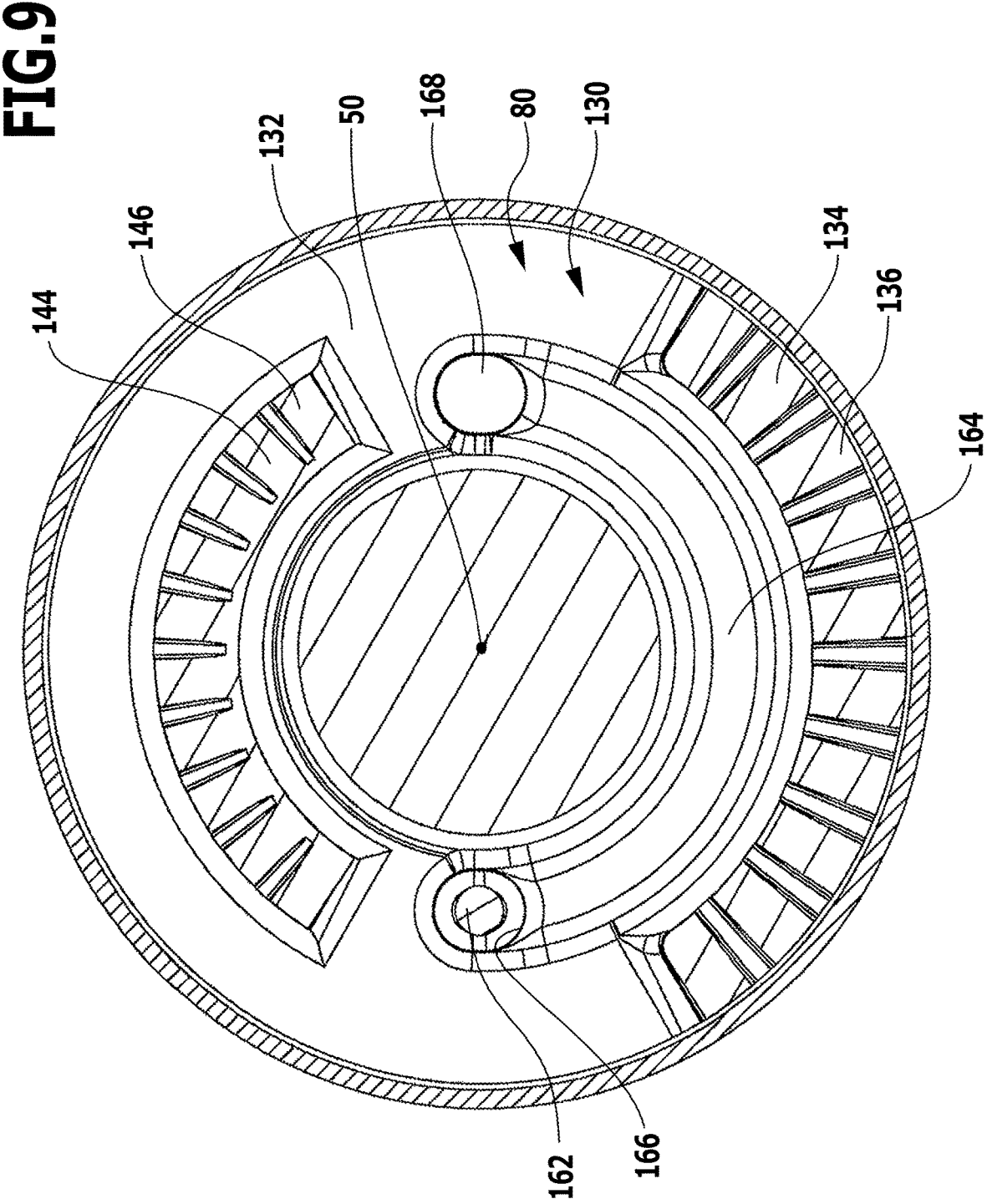
FIG. 9 shows a section along line 9-9 of FIG. 7.

In addition to the stationary form locking element carrier 112 having the first toothed segments 114 and 118 and the second toothed segments 124 and 128, the fixing unit 110 comprises a form locking element carrier 132 co-movable with the ball neck carrier 80, illustrated in FIG. 9, which form locking element carrier 132 is arranged on a pivot bearing body head 130 that protrudes radially beyond the pivot bearing body 82 and engages over the front side 70 of the bearing base 60. The form locking element carrier 132, in turn, comprises a radially outer first toothed segment 134 having first teeth 136 and a radially inner second toothed segment 144 having second teeth 146, wherein the first toothed segment 134 and the second toothed segment 144 are arranged opposite to one another relative to the pivot axis 50 and wherein the radial distance of the first toothed segment 134 and the radial distance of the second toothed segment 144 from the pivot axis 50 correspond to the radial distances of the corresponding toothed segments 114, 118 and 124, 128 respectively of the form locking element carrier 112.

Preferably, in the movable form locking element carrier 132, the first toothed segment 134 and the second toothed segment 144 are formed integrally in one piece on the movable form locking element carrier 132 and the movable form locking element carrier 132 is formed integrally in one piece on the pivot bearing body head 130 so that ultimately, the toothed segments 134 and 144 are connected in one piece to the pivot bearing body 82.

Now, in the solution in accordance with the invention, the first toothed segment 114 and the second toothed segment 124 are arranged on the stationary form locking element carrier 112 and the toothed segments 134 and 144 are arranged on the movable form locking element carrier 132 relative to one another and relative to the pivoting positions of the ball neck carrier 80 in such a manner that, in the operating position A of the ball neck 40, when the ball neck carrier 80 is moved from the pivoting position illustrated in FIG. 7 to the fixing position illustrated in FIG. 6, they can be substantially completely brought into engagement with one another, i.e., the first toothed segments 114 and 134 and the second toothed segments 124 and 144 are substantially completely in engagement with one another, i.e., substantially with all teeth.

On the other hand, if the ball neck carrier 80 in the operating position A is moved from the fixing position to the pivoting position, the first toothed segments 114 and 134 and the second toothed segments 124 and 144 come out of engagement and the ball neck carrier 80 together with the form locking element carrier 132 is freely rotatable about the pivot axis 50 relative to the stationary form locking element carrier 112 and thus also relative to the bearing base 60 until the rest position R is reached in which a movement of the ball neck carrier 80 together with the movable form locking element carrier 132 from the pivoting position to the fixing position causes the first toothed segment 134 of the movable form locking element carrier 132 to come into engagement with the further first toothed segment 118 of the form locking element carrier 112 and the second toothed segment 144 of the movable form locking element carrier 132 to come into engagement with the further second toothed segment 128 of the form locking element carrier 112, without collisions occurring with the first toothed segment 114 and the second toothed segment 124, in order for the ball neck 40 to be fixed relative to the mounting unit 26 and to be rotationally fixed relative to the pivot axis 50 also when in the rest position R. However, since in the rest position R, large loads do not occur and no large torques are exerted on the ball neck 40, the further toothed segments 118 and 128 having a few first teeth 116 and second teeth 126 suffice to absorb the torques about the pivot axis 50 when in the rest position R.

Since in the trailer hitch 20 in accordance with the invention, the operating position A is always fixed, but, depending on the different types of vehicles, the pivot angle between the operating position A and the rest position R may vary and thus the angular distance between the operating position A and the rest position R may vary, in the solution in accordance with the invention, it is preferably provided that the further first toothed segment 118 and the further second toothed segment 128 are flexibly connectable to the stationary form locking element carrier 112. As illustrated in FIG. 6 by way of example, the further first toothed segment 118 and the further second toothed segment 128 are provided with holding pins 152 and 154 which engage in receiving bores 156 and 158 in the stationary form locking element carrier 112 and are thereby fixable to same in a form-locking manner.

By way of example, the holding pins 152 and 154 are additionally fixed in the receiving bores 156 and 158 by a substance-to-substance bond.

Depending on the positioning of the receiving bores 156 and 158 relative to the first toothed segment 114 and the second toothed segment 124, the position of the further first toothed segment 118 and of the further second toothed segment 128 can also be flexibly fixed, for the particular vehicle type, according to the angular distance between the operating position A and the rest position R.

In the exemplary embodiment illustrated in FIGS. 7 to 9, the bearing base 60 together with the stationary form locking element carrier 112 and the first toothed segment 114 and the second toothed segment 124 represent a one-piece part which for cost reasons is manufactured as a cast part for example.

Further, in the exemplary embodiment illustrated in FIGS. 6 to 9, the pivot bearing body 82 together with the pivot bearing body head 130 and the movable form locking element carrier 132 having the first toothed segment 134 and the second toothed segment 144 likewise represent a one-piece part which is preferably manufacturable by casting.

Figure 10:
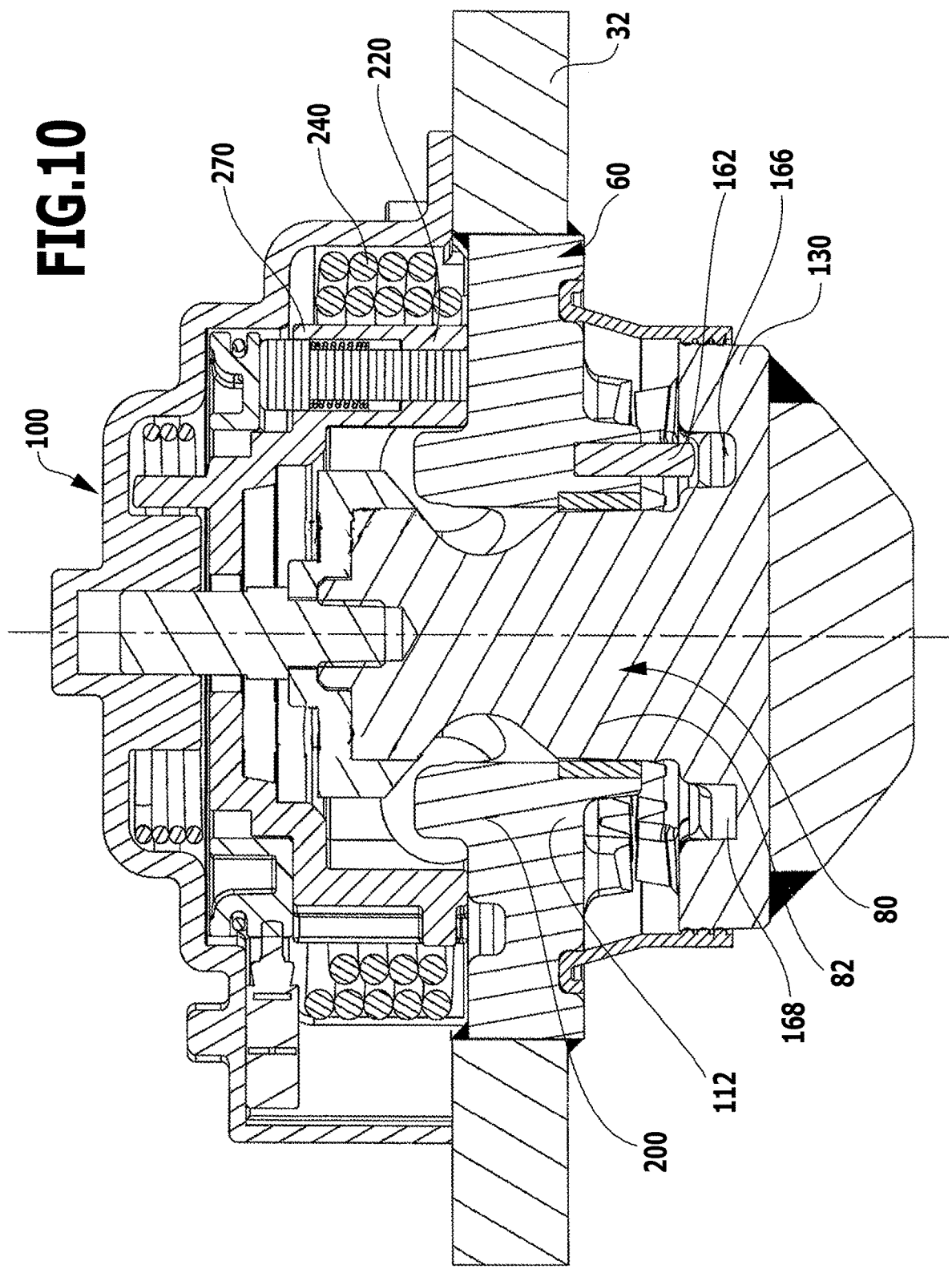
FIG. 10 shows a section along line 10-10 of FIG. 5, in the pivoting position.
Figure 11:
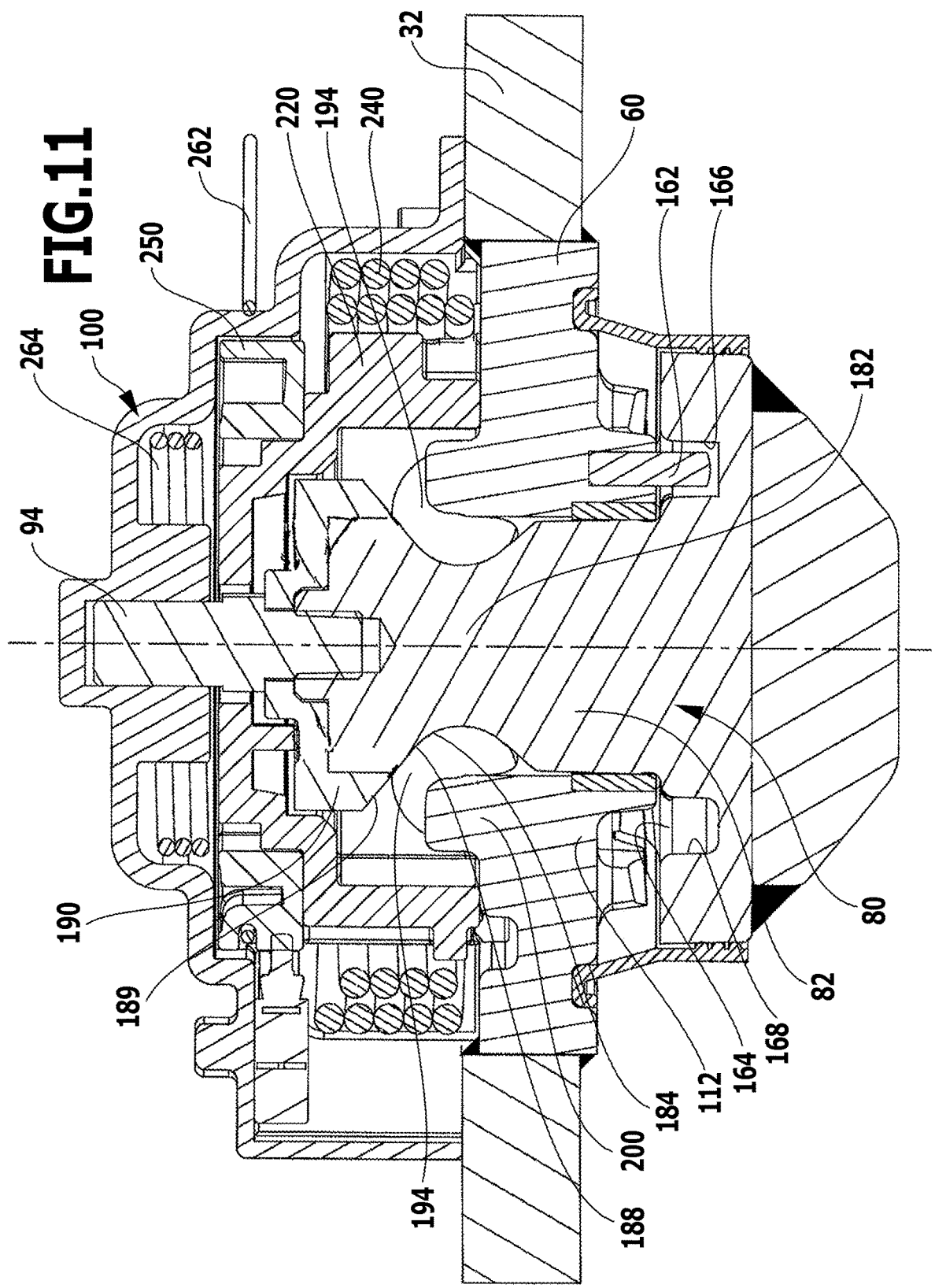
FIG. 11 shows a section similar to FIG. 10 but in the fixing position.
Figure 12:
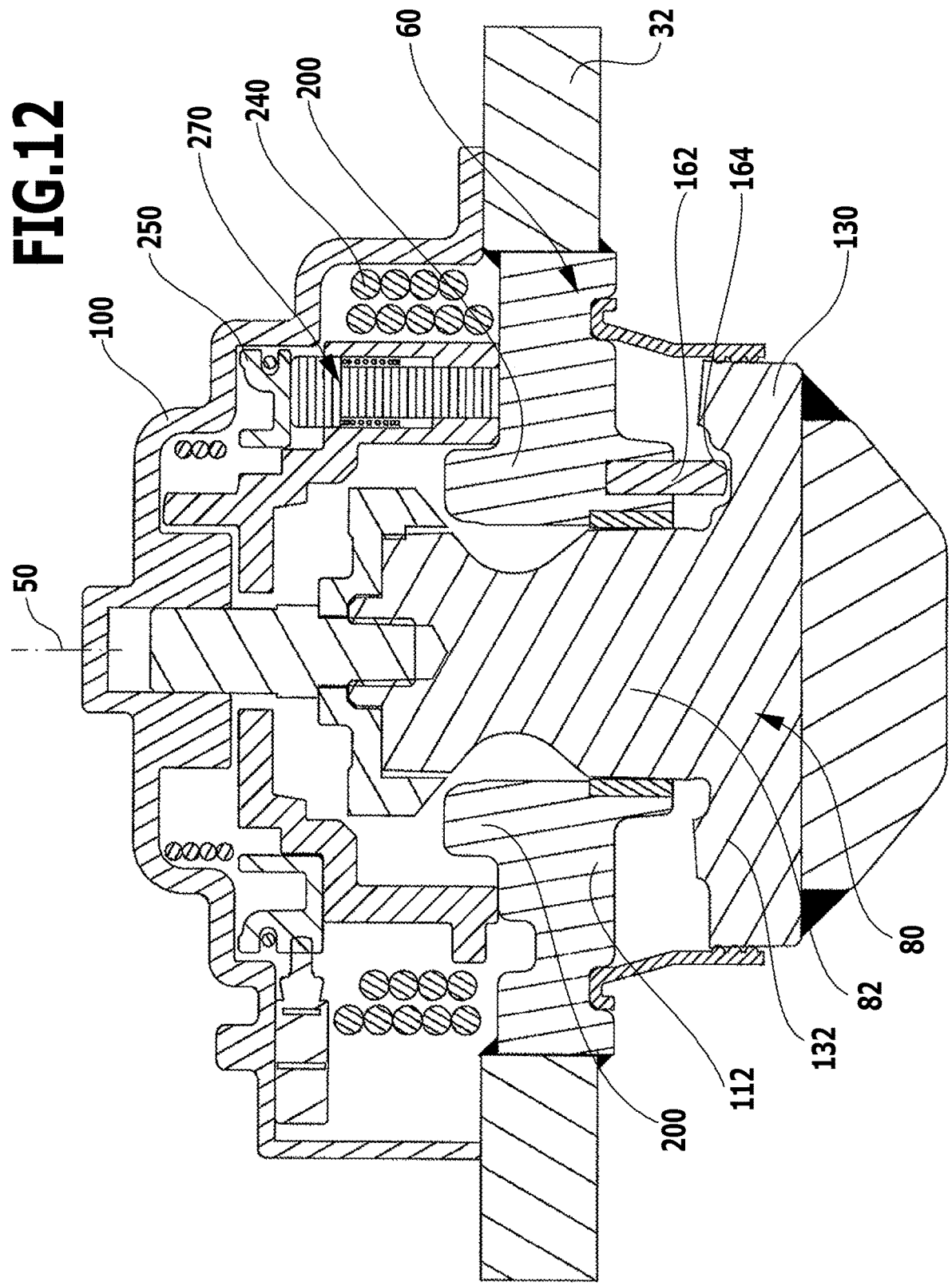
FIG. 12 shows a section in a sectional plane running through the pivot axis and through a securing element.

To prevent the toothed segments 114 and 118 from coming into engagement with the toothed segment 134 and to prevent the toothed segments 124 and 128 from coming into engagement with the toothed segment 144 in the rotary positions between the operating position A and the rest position R when the ball neck carrier 80 is pivoted about the pivot axis 50 relative to the bearing base 60 between the operating position A and the rest position R, a fixing block unit 160 is provided which, as illustrated in FIGS. 9 and 10, includes a track follower 162 arranged on the stationary form locking element carrier 112 and protruding beyond the front side 70 and the toothed segments 114, 118 and 124 and 128, said track follower 162 cooperating with a guide track 164 in the movable form locking element carrier 132 which in the operating position A and in the rest position R in each case transitions to a recess 166 and 168 which the track follower 162 is then able to enter when the operating position A and the rest position R are reached, whereas when the track follower 162 slides along the guide track 164 between the recesses 166 and 168, it prevents the toothed segments 114 and 118 and 124 and 128 from coming into engagement with the toothed segments 134 and 144, as illustrated in FIG. 11.

Figure 13:
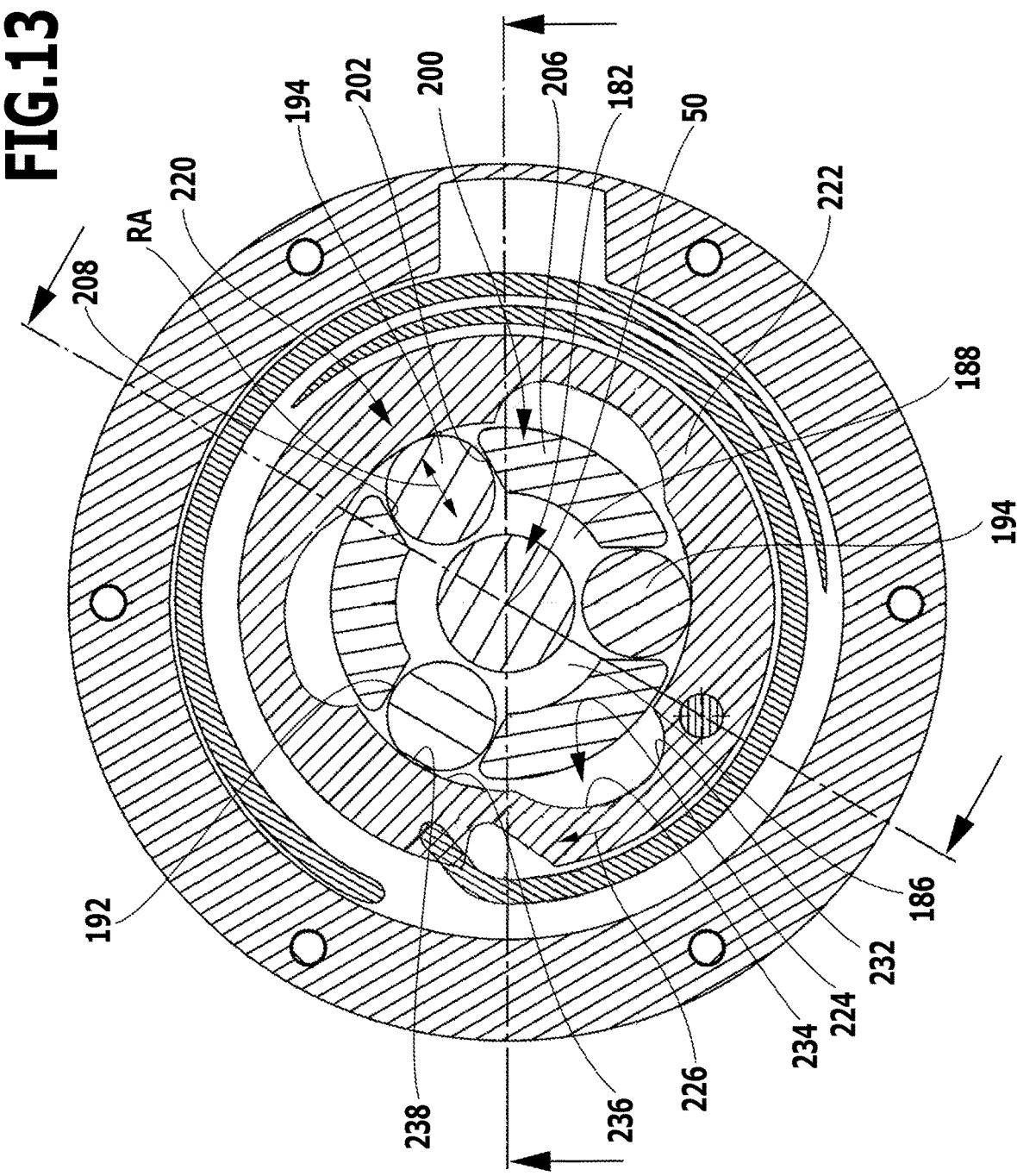
FIG. 13 shows a section along line 13-13 of FIG. 6.
Figure 14:
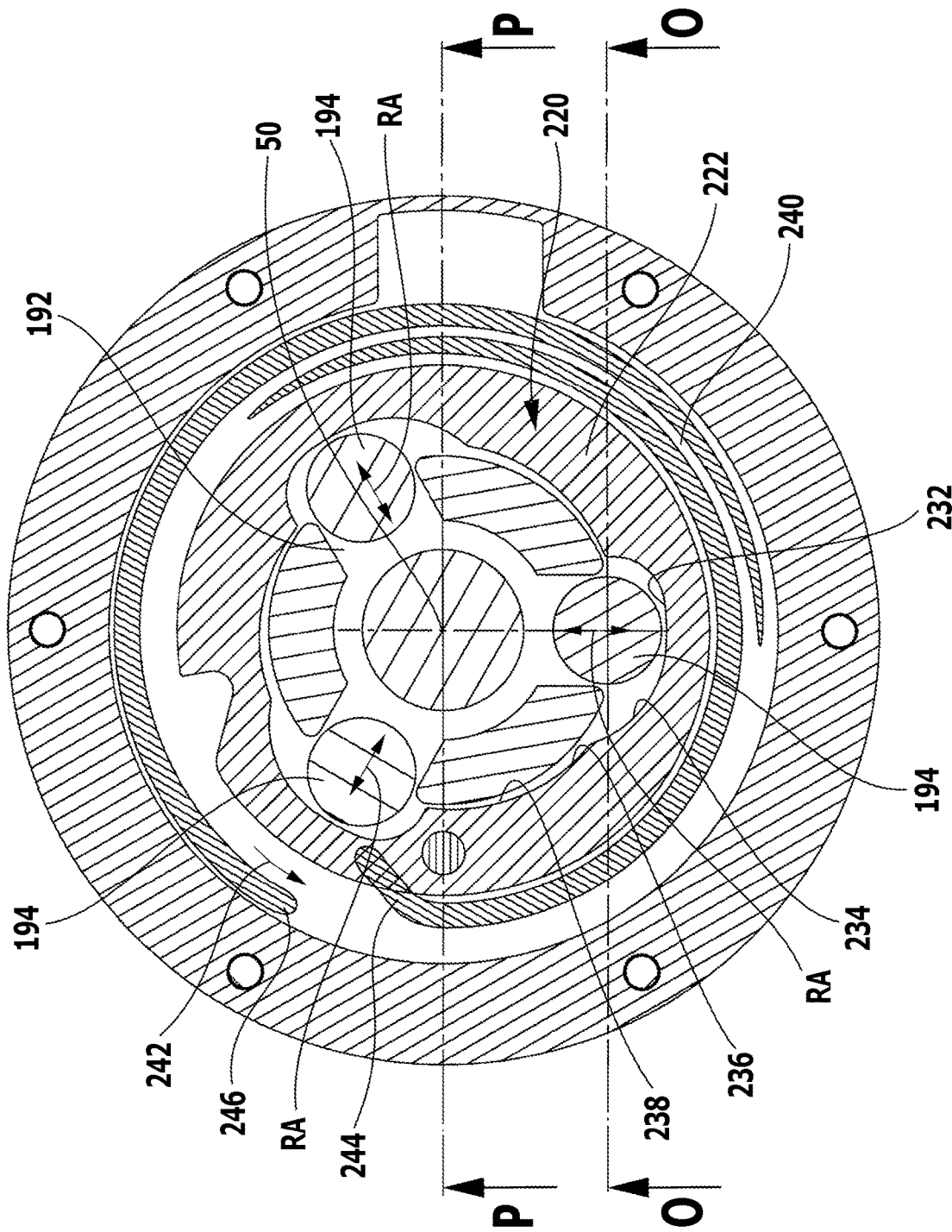
FIG. 14 shows a section along line 14-14 of FIG. 7.

In order to keep the ball neck carrier 80 and in particular also the stationary form locking element carrier 112 in engagement with the movable form locking element carrier 132 when in the fixing position of the fixing unit 110, an axially acting locking unit, generally indicated at 180 and shown in FIGS. 6 and 7 and in FIGS. 13 and 14, is provided.

Thus, the fixing unit 110 and the locking unit 180 together form a blocking unit 170, wherein, by virtue of the function of the locking unit 180 described hereinafter, the blocking unit 170 prevents the fixing position of the fixing unit 110 from being exited when in a blocking position and allows it to be exited when in a release position.

The axially acting locking unit 180 comprises a central receptacle carrier 182 which is co-movable with the ball neck carrier 80, preferably the pivot bearing body 82, in an axial direction with respect to the pivot axis 50 and which in the illustrated exemplary embodiment is preferably formed integrally in one piece on the pivot bearing body 82 and preferably comprises a plurality of locking receptacles 184, which in this exemplary embodiment are formed, for example, by an all-round recess 186 in the pivot bearing body 82 which lies between the outer bearing section 86 and the inner bearing section 96; however, individual locking receptacles 184 may also be provided in the central receptacle carrier.

Each locking receptacle 184 in turn comprises a locking surface 188 extending at an inclined angle, preferably conically, with respect to the pivot axis 50 and extending away from the pivot axis 50 with increasing radial extent, said locking surface 188 being adjoined by a pull-in surface 189 extending at the same or a varying inclination with respect to the pivot axis 50, said pull-in surface 189 extending radially beyond the bearing section 86.

The pull-in surface 189 is arranged, for example, at least in part or wholly, on an annular body 190 which is placed on the pivot bearing body 82 and protrudes radially beyond the pivot bearing body.

However, it would also be possible for the receptacle carrier 182 to be configured such that it comprises the pull-in surface 189 in its entire radial extension.

As is apparent from FIGS. 13 and 14 in particular, locking elements 194 cooperate with the locking receptacles 184, said locking elements 194 being guided for movement in a radial direction RA relative to the pivot axis 50 in a guide carrier 200 connected to the bearing base 60, namely in guides 202 thereof, in such a way that the locking elements 194 are movable, with at least one component, in the radial direction RA, and are also movable in a surface 204 which extends transversely relative to the pivot axis 50 and preferably represents a plane that is perpendicular to the pivot axis 50.

However, in theory, the surface 204 could also be configured as a surface extending, at least slightly, conically with respect to the pivot axis 50.

When the locking elements 194 move in the guides 202, action of the locking elements 194 on the pull-in surface 189 in the releasing position results in a force F directed parallel to the pivot axis 50 which moves the ball neck carrier 80 from the pivoting position in a direction of the fixing position, and thus, in the operating position A or the rest position R, brings the toothed segments 114, 118, 124, 128, 134, 144 of the form locking element carriers 112 and 132 into engagement with one another, wherein the locking element 194 acts on the locking surface 188 at least when the fixing position is reached.

The guides 202 are preferably configured as groove-like recesses which are located between ribs 206 which extend from the guide carrier 200 in a direction of the housing body 100, wherein the ribs 206 in each case form side surfaces 208 of the guides 202 between which the locking elements 194 are guided in the radial direction RA, and in addition the guide carrier 200 forms a guide bottom 210 on which the locking elements 194 are supported, against movement in a direction of the pivot axis 50, on the guide carrier 200 which defines the shape of the surface 204 along which the locking elements 194 are movable in order to come into or out of engagement with the locking receptacles 184 associated therewith.

Furthermore, for moving the locking elements 194 in the guides 202 in the radial direction RA, an actuating element, generally designated at 220, is provided that comprises an actuating surface carrier 222 which surrounds all of the locking elements 194 on their radially outer sides opposite to the locking receptacles 184, and comprises, for each of the locking elements 194, an actuating surface sequence 224 extending in a rotational direction 226, which actuating surface sequence 224 transitions from a radially outer release surface region 232 which, as illustrated in FIG. 14, allows a releasing position of the respective locking element 194, in which position said locking element 194 does not engage in the locking receptacle 184, to a displacement surface region 234 subsequent thereto in the rotational direction 226 which is able to transfer the respective locking element 194 from the releasing position to a locking position.

Adjoining the displacement surface region 234 in the rotational direction 226 is a clamping surface region 236 which has a radial distance from the pivot axis 50 that decreases with increasing extent in the rotational direction 226 and which serves to move, under a constant or varying, for example increasing, force, the locking elements 194, which are already in the locking position, in a direction of the locking receptacle 184 provided for same, until an end surface region 238 of the actuating surface sequence 224 is reached in which the respective locking element 194 acts on the locking receptacle 184 in such a way that in the locking position, clamping of the receptacle carrier 182 relative to the guide carrier 200 occurs and, by virtue of the stationary form locking element carrier 112 formed in one piece with the guide carrier 200, clamping of the toothed segments 114, 118, 124, 128, 134, 144 of the form locking element carriers 112 and 132 occurs.

As illustrated in FIGS. 13 and 14, the actuating element 220 is of annular configuration in the area of the actuating surface carrier 222 and is supported in the housing 100 for rotation about the pivot axis 50 so that the surface regions 232, 234, 236 and 238 also extend around the pivot axis 50 over arc segments that succeed one another in the rotational direction 226 and so that, by rotation of the actuating element 220 about the pivot axis 50, various different surface regions 232 to 238 act on the locking elements 194 in order to move same in the guides 202 in the radial direction RA with respect to the pivot axis 50.

In order to ensure, for example in the manually unactuated state of the trailer hitch in accordance with the invention, that the actuating element 220 always acts on the locking elements 194 in such a way that these have a tendency to move in a direction of the locking receptacles 184 and generate the force F which acts on the ball neck carrier 80, the actuating element 220 is acted upon by a torsion spring 240 in a direction of a rotational direction 242 in the sense of a movement from the releasing position to the locking position or clamping position so that the actuating element 220 always tends to act on the locking elements 194 in a direction of the locking position or the clamping position so that thereby, owing to the action of the torsion spring 240 in the unactuated position of the actuating element 220, the locking elements 194 in the pivoting position act on the pull-in surfaces 189 and/or in the fixing position act on the locking surfaces 188 and thereby apply the force F to the receptacle carrier 182 so that, consequently, the latter has a tendency to bring and/or hold in engagement the form-locking elements 114, 118, 124, 128, 134, 144 of the form locking element carriers 112 and 132.

The torsion spring 240 is preferably configured such that it winds around the actuating surface carrier 222 of the actuating element 220 and at one end 244 thereof engages the actuating surface carrier 222 of the actuating element 220, while at the other end 246 thereof engages the bearing base 60 and at this end 246 is therefore fixed relative to the bearing base 60.

Figure 15:
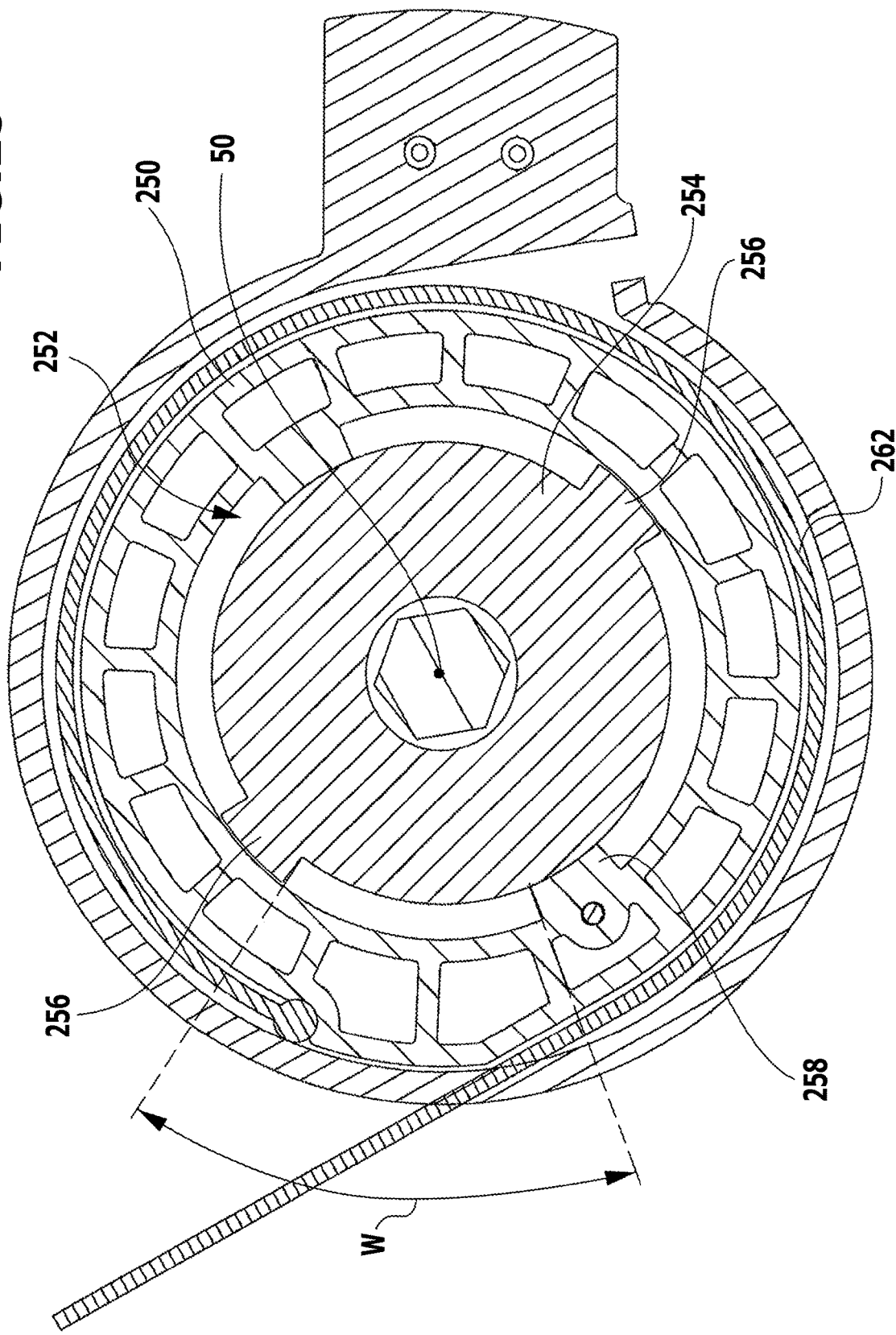
FIG. 15 shows a section along line 15-15 in a starting position of a rotary driving element and a locking position of an actuating element.
Figure 16:
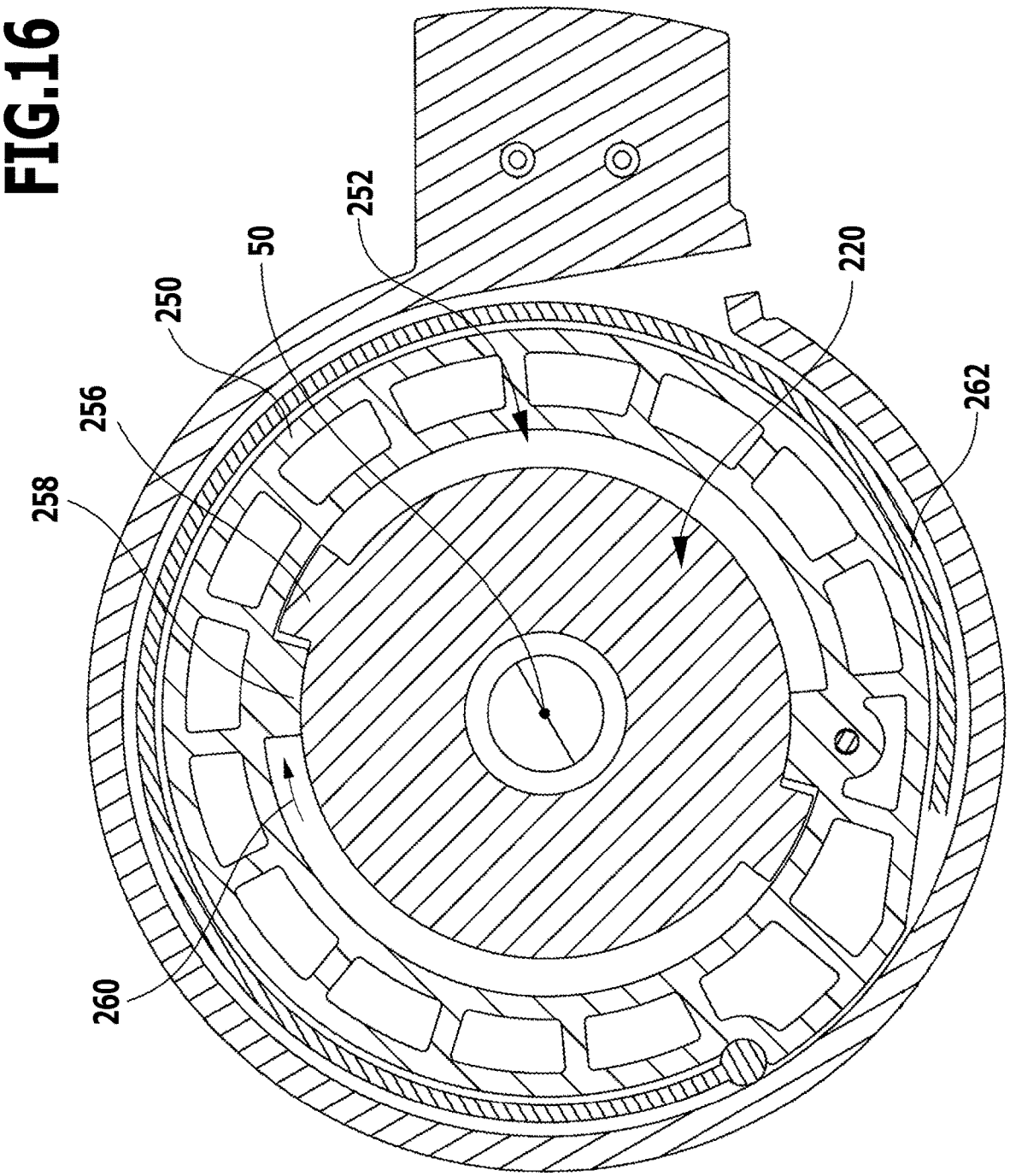
FIG. 16 shows a section similar to FIG. 15 but illustrating a driving position of the rotary driving element and of the actuating element in a transition from the locking position to a releasing position.
Figure 17:
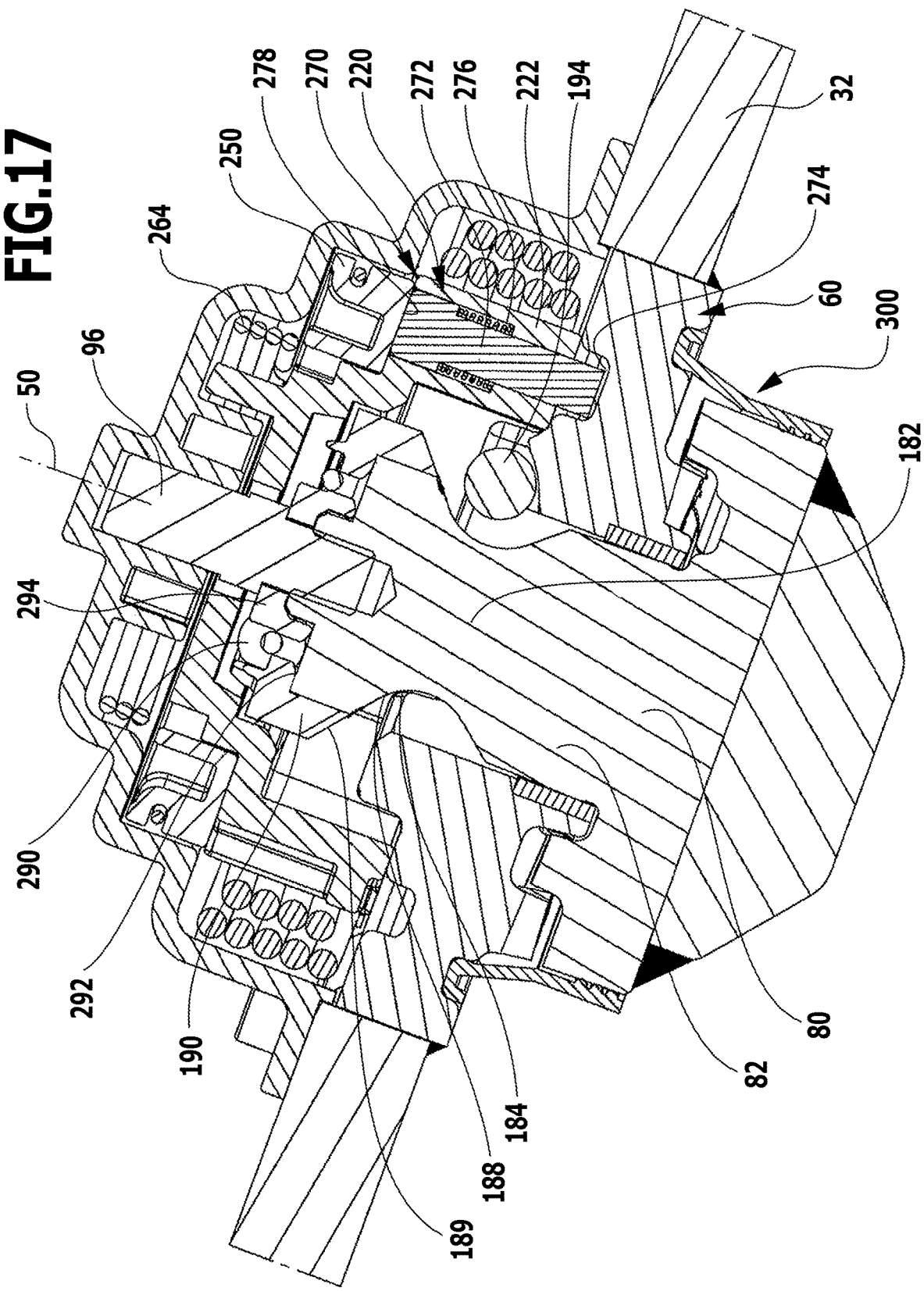
FIG. 17 shows a section in a sectional plane running through the pivot axis and extending centrally through a securing element.

For rotating the actuating element 220 against the force of the torsion spring 240, a rotary driving element, generally designated at 250, is provided which, as illustrated in FIGS. 15 and 16, likewise extends annularly around the pivot axis 50 and which can be coupled to the actuating element 220 via a freewheeling coupling 252.

For example, the actuating element 220, as illustrated in FIGS. 6 and 7, on an inner part 254 thereof which is connected to the actuating surface carrier 222 and is arranged on the side of the actuating surface carrier 222 facing away from the bearing base, is provided with a cam 256 which can be acted upon by a driver 258 of the rotary driving element 250 which projects in a direction of the cam 256, in order to be able to co-rotate the cam 256, and thus also the actuating element 220, with the rotary driving element 250.

In the locking position and in particular the clamping position of the actuating element 220 and in the unactuated position thereof, i.e., in a starting position of the rotary driving element 250, an angular distance W is present between the driver 258 and the cam 256 of the actuating element 220, as a result of which the actuating element 220 is able to freely move from any of its positions to the locking position, in particular to the clamping position, wherein when the rotary driving element 250 is actuated, i.e., rotated, initially the actuating element 220 is not carried therewith, and only after the angular distance W has been passed through does the rotary driving element 250 co-rotate the actuating element 220 by virtue of the driver 258 acting on the cam 256 in the rotational direction 260, thereby co-rotating the actuating element 220.

The rotary movement of the rotary driving element 250 can be initiated, for of example, as illustrated in FIGS. 15 and 16, by a pull cable 262 which acts on the rotary driving element 250.

The rotary driving element 250 can be brought into its starting position illustrated in FIG. 15 by way of a torsion spring 264, while pulling on the pull-cable 262 causes the rotary driving element 250 to rotate in the rotational direction 260 against the action of force of the torsion spring 264 in order to then, from a driving position, drive the cam 256 with the driver 258 and thus cause the actuating element 220 to co-rotate.

The freewheeling coupling 252 serves to release a securing unit 270, wherein the securing unit 270 serves to prevent the actuating element 220 from rotating out of the locking position.

The securing unit 270 comprises a securing element 272 which is supported for displacement parallel to the pivot axis 50 in the actuating element 220, preferably the actuating surface carrier 222, and which can be brought into engagement with a securing receptacle 274 in the bearing base 60 and is in an engaged state when the rotation of the actuating element 220 out of one of the possible locking positions, comprising the clamping positions, into the releasing position is to be prevented. To this end, the securing element 272 is preferably acted upon by a spring 276 in a direction such that the securing element automatically releases from the securing receptacle when the movement of the securing element 272 is released.

The action on the securing element 272 in a direction of the securing receptacle 274 and the entry thereof into the securing receptacle 274 are effected by a slide track 278 on the rotary driving element 250, wherein the slide track 278 allows the securing element 272 to come out of engagement with the securing receptacle 274, preferably at a time shortly before the actuating element is driven by the driver 258 acting on the cam 256, in order to permit rotation of the actuating element 220.

However, as soon as the action on the rotary driving element 250 ceases and the rotary driving element 250 has reached its starting position, owing to the action of the torsion spring 240, the actuating element 220 has also reached its locking position or clamping position so that the securing element 272 has been brought into engagement with the securing receptacle 274 by way of the slide track 278 and is held in engagement therewith by way of the slide track 278.

Thus, the securing unit 270 provides additional securement of the actuating element against becoming released of its own accord.

Figure 18:
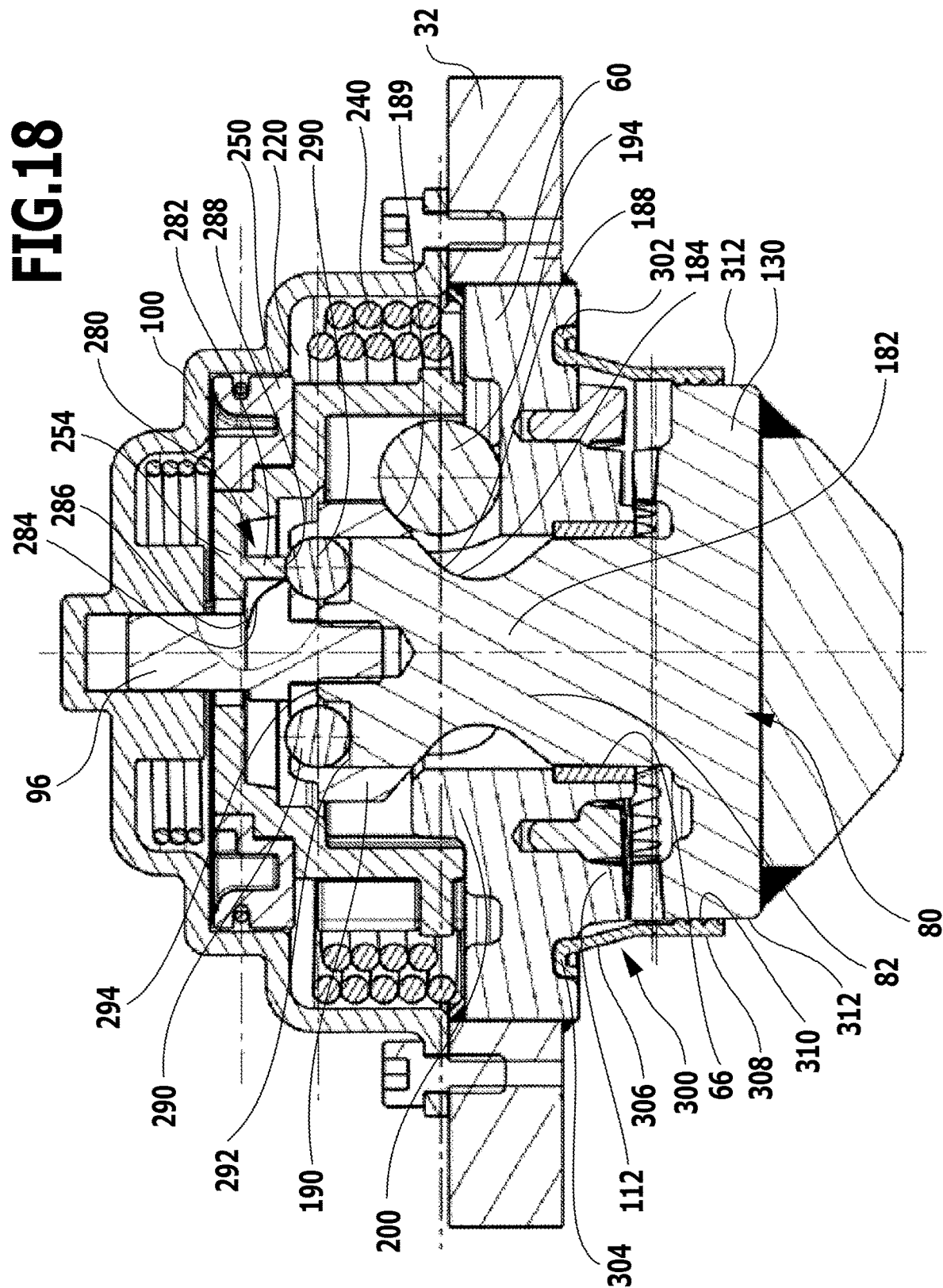
FIG. 18 shows a section corresponding to FIG. 7, with an internal bearing section partially broken away.

When the actuating element 220 is transferred from the locking position, in particular the clamping position of the locking position, to the releasing position, to ensure that not only are the locking elements 194 enabled to transition into their radially outer position in which they are in contact against the release surface regions 232, but also that, after the locking elements 194 have transitioned to the releasing position, the ball neck carrier 80, in particular the pivot bearing body 82, is also moved opposite to the direction of force F in a direction of the pivot axis 50, as illustrated in FIGS. 7 and 18, a push-out unit 280 is provided which comprises a push-out element 282 that is provided on the inner part 254 of the actuating element 220 and has an inclined surface 284 which comprises a region 286 that has a maximum distance from the bearing base 60 and rises to a region 288 that has a minimum distance from the bearing base 60 so that when the actuating element 220 is rotated, the inclined surface 284 of the push-out element 282 acts upon a pressure-absorbing element 290 which is formed for example as a sphere and is arranged for example in a step-shaped transition region 292 of the pivot bearing body 82 from the region which forms the receptacle carrier 182 into the inner bearing section 96 and is guided into a cage body 294 connected to the annular body 190 and held by same to the pivot bearing body 82.

If the pressure-absorbing element 290 now slides along on the inclined surface 284 from the region 286 to the region 288, then this causes the pivot bearing body 82 and hence the entire ball neck carrier 80 to be increasingly displaced from the fixing position illustrated in FIG. 6 to the pivoting position illustrated in FIG. 7.

The push-out element 282 having the inclined surface 284 is arranged such that the latter acts on the pressure-absorbing element 290, which is arranged on the ball neck carrier 80, when the actuating element 220 is already rotated far enough in the rotational direction 260 that it releases the locking elements 194 and allows them to transition to the releasing position. The push-out element 282 having the inclined surface 284 then becomes effective and acts on the pressure-absorbing element 290 in such a way that upon further rotation of the actuating element 220, the ball neck carrier 80 and also the pivot bearing body 82 transition from the fixing position to the pivoting position as the result of a movement in a direction of the pivot axis 50.

Thus, by way of the push-out unit 280, forcible movement of the ball neck carrier 80 and the pivot bearing body 82 from the fixing position to the releasing position and hence release of the form-locking elements of the form locking element carriers 112 and 132 is achieved in a forcibly controlled manner.

For sealing between the pivot bearing body 60 and the ball neck carrier 80, a sealing unit 300 is provided on the pivot bearing body 60, for example radially outside the form locking element carrier 112, which sealing unit 300 extends around same and is fixed in a groove 304 in the bearing base 60 by way of a fixing segment 302 and, at a cylindrical shielding segment 306 thereof, extends starting from the fixing segment 302 in a direction of the pivot bearing body head 130 and, at a terminating segment 308 thereof which carries ribs 310 that protrude radially inwardly and extend annularly around the pivot axis 50, is in contact against a cylindrical circumferential surface 312 of the pivot bearing body head 130 which extends relative to the pivot axis 50, wherein, when the ball neck carrier 80 is displaced between the fixing position and the pivoting position, the cylindrical circumferential surface 312 is movable relative to the terminating segment 308 and the ribs 310, but the terminating segment 308 having the ribs 310 is arranged such that the terminating segment 308 having the ribs is in contact against the cylindrical circumferential surface 312 in sealing engagement therewith both when in the pivoting position and when in the fixing position.

In particular, the terminating segment 308 having the ribs 310 is produced undersize with respect to the cylindrical circumferential surface 312 so that the terminating segment having the ribs 310 is in contact against the cylindrical circumferential surface 312 under the action of a force in a radial direction and provides the required sealing effect.

The above-described exemplary embodiment in accordance with the invention works as follows.

Starting from a condition in which the ball neck carrier 80 is in its fixing position, either in the operating position A or in the rest position R, and is thus fixed in place in this fixing position by the locking unit 180, actuating the rotary driving element 250 by pulling on the pull-cable 262 causes same to rotate in the rotational direction 260. Provided that the driver 258 has not yet reached the cam 256, the securing element 272 of the securing unit 270 is released by virtue of the previously described coaction of the rotary driving element 250 with the securing unit 270.

After the angular distance W is passed through, the driver 258 reaches the cam 256 and acts on the actuating element 220 in such a manner that same is rotated in the rotational direction 260, against the action of the torsion spring 240, from the locking position, in particular the clamping position in the locking position, in a direction of its releasing position. The locking elements 194 are enabled to move from the locking position, in particular the clamping position in the locking position, in a direction of their releasing position, as has already been described.

After the actuating element 220 has rotated far enough in the rotational direction 260 that the locking elements 194 are enabled to transition fully to the releasing position, the push-out unit 280 becomes effective in the described manner and displaces the ball neck carrier 80 from the fixing position to the pivoting position in the manner described.

Simultaneous with the displacement of the ball neck carrier 80 from the fixing position to the pivoting position, the track follower 162 comes out of engagement with the recess 166, 168 in the fixing block unit 160 that is associated with the starting position.

In the pivoting position, the form-locking elements 114, 118, 124, 128, 134, 144 no longer mesh with each other; instead, they allow free pivotability about the pivot axis 50 so that after reaching the pivoting position, the ball neck carrier 80 together with the ball neck 40 can pivot about the pivot axis 50 from the starting position, for example the operating position or the rest position, to the respective final position, for example the rest position or the operating position, wherein immediately after the ball neck carrier 80 begins to pivot about the pivot axis 50, the track follower 162 is no longer opposite to one of the recesses 166 and 168 but is opposite to the guide track 164.

If, immediately after the track follower 162 is opposite to the guide track 164, action on the pull-cable 262 is ceased, the rotary driving element 250 is moved in the direction of its starting position, in opposition to the rotational direction 260, and as a result of this, the actuating element 220 is subjected to the action of force of the torsion spring 240 which tends to move the actuating element 220 from the releasing position to the locking position and in particular to the clamping position thereof. This causes the locking elements 194 to be acted on, and consequently the locking elements 194 act on the pull-in surface 189, thereby generating the force F on the receptacle carrier 182 and thus also on the ball neck carrier 80.

As a result, owing to the force F, the guide track 164 acts against the track follower 162 with force F, but the track follower 162 prevents the ball neck carrier 80 from moving from the pivoting position to the fixing position.

Thus, rotating the ball neck carrier 80 and hence also of the ball neck 40 is possible until same has reached the respective final position in which the track follower 162 is again located opposite to one of the recesses 168 and 166. In this final position, the ball neck carrier 80 is thus able to move from the pivoting position to the fixing position, wherein this is realized under the action of the force F generated by the locking elements 194 in cooperation with the pull-in surface 189, said force F still being present when the locking elements act on the locking surfaces 188 of the receptacle carrier 182.

When the ball neck carrier 80 moves from the pivoting position to the fixing position, the form-locking elements 114, 118, 124, 128 and 134 and 144 come into engagement with one another so that the fixing unit 110 again provides a rotationally fixed fixing of the ball neck carrier 80 and thus of the ball neck 40 in this final position, i.e., the rest position or the operating position.

When the receptacle carrier 182 moves from the pivoting position to the fixing position, the locking elements 194 also move from their releasing position to the locking position, in particular even the clamping position, under the action of the actuating surface sequence 224, in the described manner, so that the actuating element 220 is thereby also enabled to move to the locking position, in particular to the clamping position of the locking position, so that the cam 256 is again located at an angular distance W from the driver 258 of the rotary driving element 250 so that the initial condition is again present, starting from which the operation of the trailer hitch in accordance with the invention has been described.

When the actuating element 220 moves back in a direction opposite to the rotational direction 260, when the locking position is reached, the securing unit 270 again becomes effective by the securing element 272 coming into engagement with the securing receptacle 274, wherein the securing element 272 is moved against the force of the spring 276 into the securing receptacle 274 by the rotary driving element 250 which is acted upon by the torsion spring 264.

Figure 19:
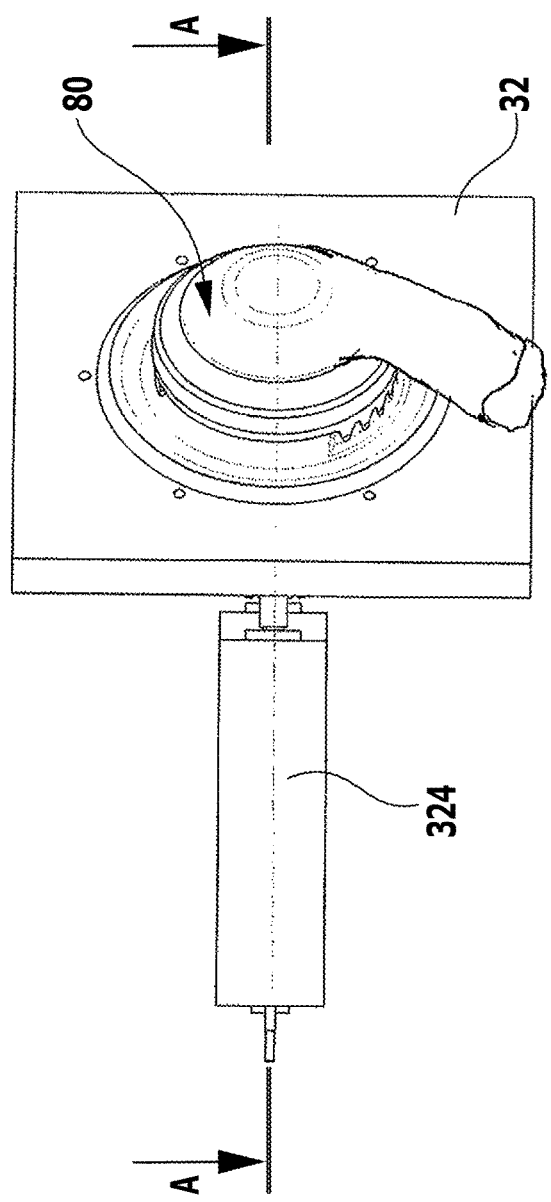
FIG. 19 shows a perspective view of a second exemplary embodiment of a trailer hitch in accordance with the invention.
Figure 20:
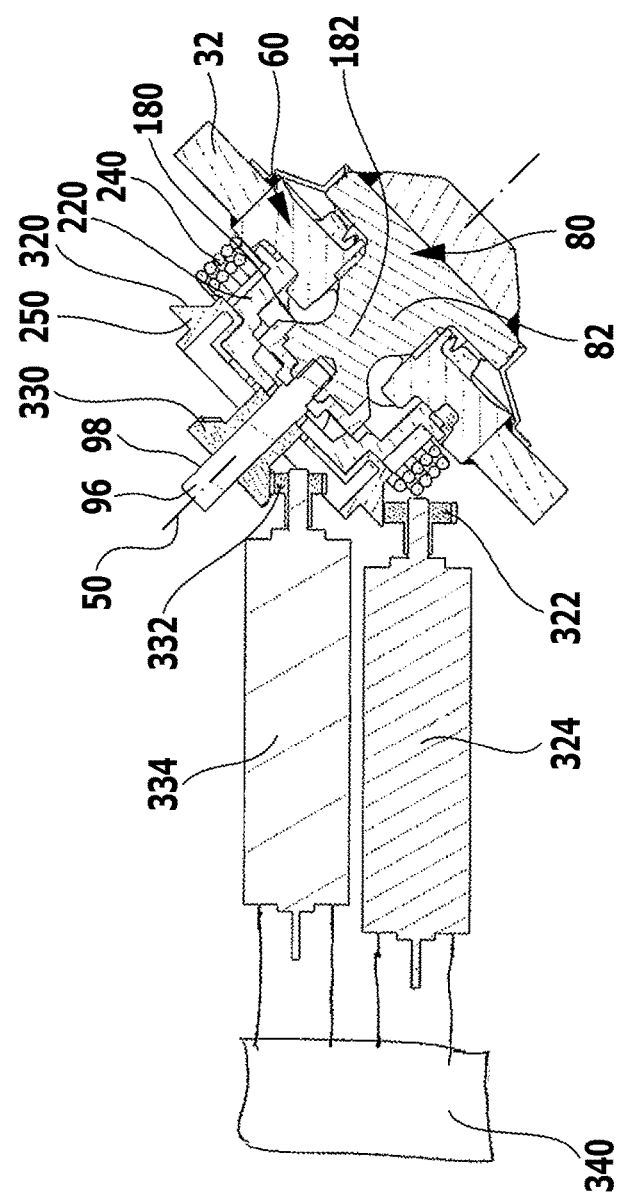
FIG. 20 shows a section along line 20-20 of FIG. 19.

In a second exemplary embodiment of the trailer hitch in accordance with the invention, represented in FIGS. 19 and 20, the same reference numerals are used to denote elements that are identical to those described in relation to the exemplary embodiment described in the foregoing so that reference may be made in full to what has been described for the previous exemplary embodiment.

As contrasted to the first exemplary embodiment, the rotary driving element 250 is not drivable by a pull cable and instead is provided with external teeth 320 which, for example, extend conically with respect to the pivot axis 50.

In engagement with these external teeth 320A is drive pinion 322 which is drivable by an actuating motor 324 which preferably has an integrated reduction gear.

Furthermore, provided between the inner bearing section 96, which carries the inner guide surface 98, and the receptacle carrier 182 of the locking unit 180 is a drive wheel 330 which is connected to the pivot bearing body 82 in rotationally fixed relation therewith, wherein the drive wheel 330 is configured as a bevel gear for example.

In engagement with the drive wheel 330 is a drive pinion 332 which is drivable by a pivoting motor 334.

Both the pivoting motor 334 and the actuating motor 324 are controllable by a controller, denoted generally at 340, which controls the actuating motor 324 and the pivoting motor 334 as described in the following.

For example, if, starting from the fixing position of the ball neck carrier 80 and the locking position of the locking unit 180, it is desired to transfer the ball neck carrier 80 to the pivoting position, then the controller 340 initially controls the actuating motor 324 so that the actuating motor 324 moves the rotary driving element 250 from the starting position to the driving position and then, in the driving position, rotates the actuating element 220 in such a way that same transfers from its clamping position or locking position to the releasing position and thus releases the locking of the receptacle carrier 182 on the part of the locking unit 180.

Furthermore, the actuating element 220 continues to be rotated by the actuating motor 324 until the push-out unit 280 has displaced the ball neck carrier 80 from the fixing position to the pivoting position, as illustrated in FIG. 7 for example.

The actuating motor 324 is stopped after the pivoting position is reached.

At the same time that the pivoting position is reached, the pivoting motor 334 is activated and causes pivoting from the operating position to the rest position or from the rest position to the operating position.

After the pivoting of the ball neck carrier 80 has begun, the actuating motor 324 can be operated in the reverse direction so that the rotary driving element 250, driven by the actuating motor 324, again moves into the starting position.

Without the actuating motor 324 acting on the actuating element 220, the torsion spring 240 acts on the actuating element 220 and, consequently, the actuating element 220 acts on the locking elements 194 in a direction of the locking position so that the locking elements 194 generate the force F on the ball neck carrier 80 by acting on the pull-in surface 189.

However, the force F does not lead to a movement in a direction of the fixing position until the respective final position, i.e., the operating position or the rest position, is reached, because this movement is prevented by the coaction of the track follower 162 with the guide track 184.

As soon as the ball neck carrier 80 has reached the final position, that is, the rest position or the operating position, the receptacle carrier 182 and therefore the ball neck carrier 80 moves in a direction of the fixing position because the locking elements 194, acted upon by the actuating element 220, in particular the actuating surface sequence 224, and activated by the torsion spring 240, generate the force F and because the transition to the fixing position is possible by the track follower 162 in the respective final position being able to enter the recesses 166 and 168, thus allowing the ball neck carrier 80 to move from the pivoting position to the fixing position.

After the final position is reached in each case, the controller 340 switches off the pivoting motor 334.

Figure 21:
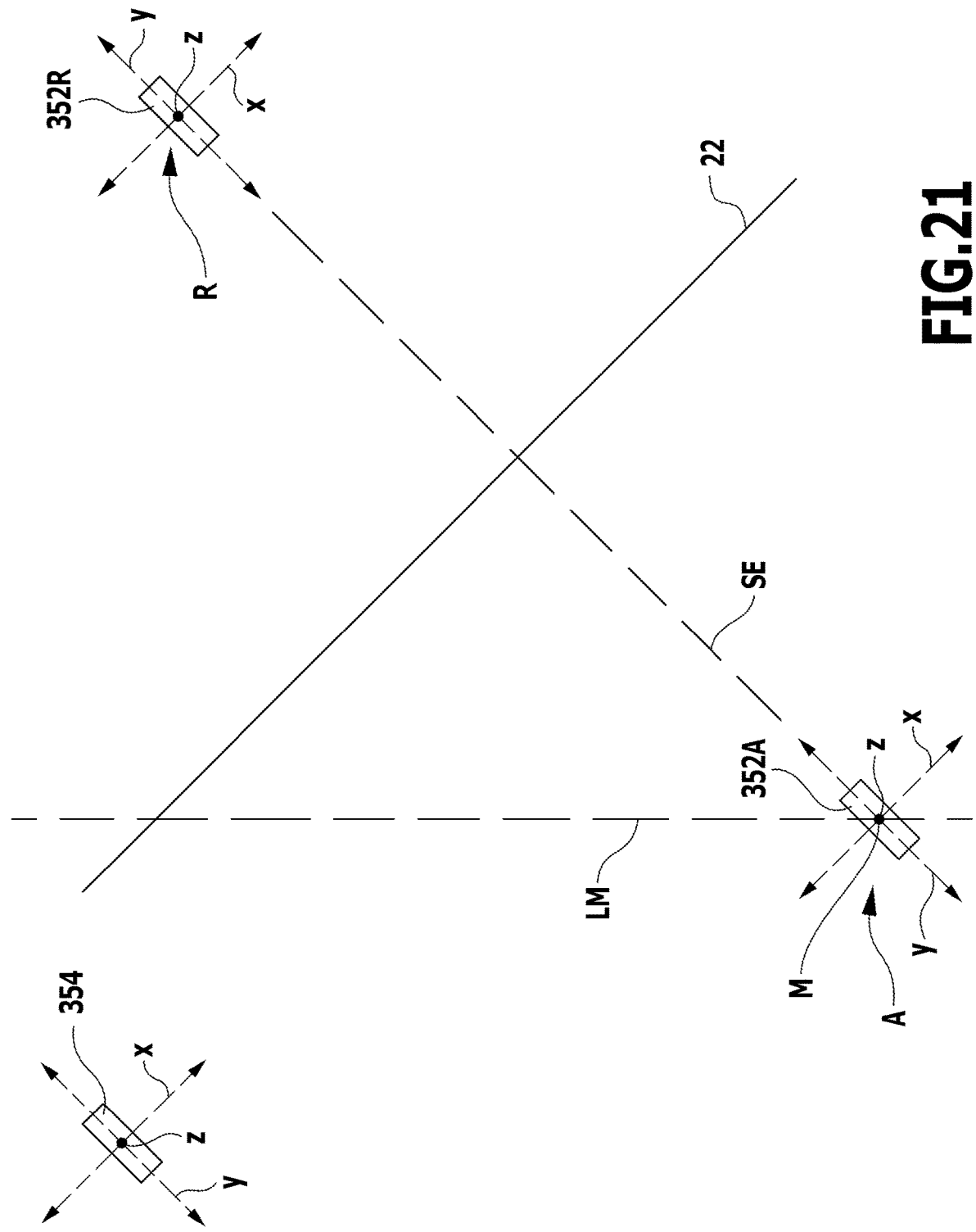
FIG. 21 shows a schematic representation illustrating the orientation of the sensors of the sensor system.

In the exemplary embodiments as described, a sensor system 350 is provided, as illustrated in FIGS. 3 and 4 and FIG. 21, said sensor system 350 comprising a first sensor 352 and a second sensor 354, wherein the first sensor 352 is arranged at the ball neck 40 and is thus movable about the pivot axis 50, while the second sensor 354 is arranged in stationary relation to the bearing base 60 and hence the mounting unit 26.

Preferably, the first sensor 352 and the second sensor 354 are micromechanical systems fabricated by MEMS technology which can be used, for example, both as an acceleration sensor and as an inclination sensor.

As illustrated in FIGS. 3 and 4 and FIG. 21, each of these sensors 352, 354 is configured as an approximately cuboid-shaped block and is capable of measuring accelerations in a direction in space X, Y or Z and/or in two directions in space and/or in three directions in space, for example in the X, Y, Z directions in space, and is further capable of detecting inclinations in the YZ plane about the X axis as an axis of rotation and of detecting inclinations in the X-Z plane about the Y axis as an axis of rotation, starting out from the assumption that the coordinate system is oriented such that the Z axis encloses the smallest angle having a direction of gravity SR, i.e., is in particular approximately parallel to the direction of gravity SR.

Preferably, the sensors 352 and 354 are oriented such that for the first sensor 352, the Z axis in the operating position A of the ball neck 40 runs substantially parallel to the direction of gravity SR or at a small acute angle relative thereto and also runs substantially parallel to the direction of gravity SR or at an acute angle thereto in the rest position, albeit in an inverted direction.

Furthermore, the second sensor 354 in accordance with FIGS. 3 and 4 and FIG. 21 is oriented such that, with the usual mounting of the trailer hitch 20 to a motor vehicle 10 and with the motor vehicle 10 placed on a horizontal surface, the Z direction of the second sensor 354 also extends substantially parallel or at a small acute angle to the direction of gravity SR.

The expression "substantially parallel" is understood to mean deviations from an exactly parallel orientation of up to 5° (angular degrees) and "at a small acute angle relative to the direction of gravity SR" is understood to refer to angles of up to 30°.

Furthermore, the sensor 352 is arranged such that in the operating position 352A thereof (FIG. 21), its Y direction extends parallel to a pivoting plane SE running perpendicularly to the pivot axis 50 and its X direction extends perpendicularly to the pivoting plane SE running perpendicularly to the pivot axis 50, i.e., extends parallel to the pivot axis 50, and is arranged such that in the rest position 352R thereof, the Y direction also extends parallel to the pivoting plane SE running perpendicularly to the pivot axis 50 and the X direction extends approximately perpendicularly to the pivoting plane SE running perpendicularly to the pivot axis 50.

Furthermore, as shown in FIG. 21, the second sensor 354 is arranged such that its Y direction extends parallel to the pivoting plane SE running perpendicularly to the pivot axis 50 and that its X direction extends perpendicularly to a pivoting plane SE running perpendicularly to the pivot axis 50, i.e., extends parallel to the pivot axis 50.

However, it is likewise conceivable for the second sensor 354 to be arranged such that its X direction extends parallel to the vertical longitudinal center plane LM of the trailer hitch 20 and that its Y direction extends transversely, preferably perpendicularly, to the vertical longitudinal center plane LM of the trailer hitch 20; this then requires conversion of the measuring values of the second sensor 354 in the coordinate system thereof to the orientation of the coordinate system of the first sensor 352, in order to determine an inclination difference.

The two sensors 352 and 354 are connected to an evaluation unit 358 of the sensor system 350 which provides position information SI on the basis of the following evaluation of the signals of the sensors 352 and 354.

It is apparent from FIGS. 3 and 4 and FIG. 21 that pivoting of the ball neck carrier 80 together with the ball neck 40 from the operating position A shown in FIG. 3 to the rest position R shown in FIG. 4 results in that the first sensor 352 detects a change in inclination of its Z axis relative to the direction of gravity SR about the X axis as the inclination axis in the YZ plane parallel to the pivoting plane SE, and that, via a state in which the Z direction extends approximately perpendicularly to the direction of gravity SR, the first sensor 352 transitions, with increasing inclination in the YZ plane relative to the operating position A, to the rest position R with inverted orientation, for example wherein in the rest position R, the Z direction is rotated approximately 180° relative to the Z direction in the operating position A and is therefore inverted.

This inversion in the Z direction in the transition from the operating position A to the rest position R would already suffice for a rough detection of the operating position A and the rest position R, in particular when the varying inclinations of the Z direction in the YZ plane that lie between these inversions in the Z direction are taken into account by the evaluation unit 358.

Further improvement of the evaluation of the inclination in the Z direction in the YZ plane in the transition from the operating position A to the rest position R or vice versa can be achieved if the signals of the sensor 352 are brought in relation to the orientation of the second sensor 354 which represents a reference sensor for the orientation in space of the trailer hitch 20 and thus enables a difference measurement on the basis of the for example parallel orientation of the Z axes which is known, for example, for one of the final positions, in particular the operating position A or the rest position R, said difference measurement thus providing a reliable reference value for the location of the Z direction of the first sensor 352 in one of the final positions, in particular in the operating position A or in the rest position R, relative to the orientation in space of the Z direction of the second sensor 354, even when the motor vehicle 10 is inclined in any direction.

Preferably, the evaluation unit 358 is provided with a reference value storage device RWS in which are stored reference values for the relative orientations of the Z axis of the first sensor 352 relative to the orientation of the Z axis of the second sensor 354, which reference values are linked to angle information on the rotary angle about the pivot axis 50 when the rotary movement of the ball neck 40 is carried out so that the rotary angle relative to the pivot axis 50 and the angular distance from the respective final positions, i.e., from the operating position A and the rest position R, can be inferred from the inclination of the Z axis of the first sensor 352 in relation to the orientation of the Z axis of the second sensor 354.

Since in the exemplary embodiments described above, when the ball neck carrier 80 transitions from the fixing position to the pivoting position and vice versa, the ball neck carrier 80 is displaced in a direction of the pivot axis 50, the first sensor 352 also detects this translatory movement by the accelerations occurring in a direction of the pivot axis 50 which, particularly when the X axis is oriented parallel to the pivot axis 50, advantageously can be detected as accelerations in the X direction in the coordinate system of the first sensor 352, in particular wherein initial accelerations occur at the commencement of the translatory movement in a direction of the pivot axis and final accelerations, with opposite direction to that of the initial accelerations, occur on the basis of the limitation of the movement in the releasing position and in the fixing position by way of stop elements.

Both the initial accelerations and the final accelerations can be detected by the first sensor 352 via a time axis.

For eliminating potential disturbing accelerations, the accelerations in a direction of the pivot axis 50 are also detected by the second sensor 354 and difference values between these and the accelerations detected by the first sensor are formed so that the evaluation unit 358 can also determine position information related to the translatory movements in a direction of the pivot axis 50.

In the second exemplary embodiment, the position information SI generated by the sensor system 350, which position information SI comprises, in particular, position information concerning the translatory movement in a direction of the pivot axis 50 and position information concerning the rotary movement about the pivot axis 50, is delivered to the controller 340 which controls the actuating motor 324 and the pivoting motor 334.

In the second exemplary embodiment, the controller 340 is controlled by a sequence controller 370.

The controller 340 additionally cooperates with a rotary movement sensor 362 and 364 of the actuating motor 324 and the pivoting motor 334 respectively, each of which has the capability of generating a rotary movement signal DBS so that the controller 340 on the one hand, via the position information SI, has available to it information concerning the positions of the ball neck carrier 80 together with the ball neck 40 relative to the pivot axis 50 and in addition to that can recognize, via the rotary movement signal DBS, how many revolutions have taken place in the respective actuating motor 324 and pivoting motor 334, and determines therefrom a rotary movement relation.

If the controller 340 operates in the pivoting mode of operation SBM, then, starting from one of the final positions, for example the operating position, the actuating motor 324 is controlled on the part of the controller 340 in such a manner that the actuating motor 324 is caused to move with a sense of rotation which, first, causes the locking unit 180 to transition from the clamping position to the releasing position, wherein the controller 340 can recognize on the one hand, via the position information SI, whether or not the ball neck carrier 80 together with the ball neck 40 moves in a direction of the pivot axis 50 and can recognize on the other hand, via the rotary movement signal DBS of the rotary movement sensor 362, that the actuating motor 324 is active and drives the locking unit 180 in the sense of releasing the transfer of the locking unit 180 from the clamping position to the releasing position.

With continued rotation of the actuating motor 324, drive is imparted to the push-out unit 280 and, therefore, translatory movement is imparted to the ball neck carrier 80 from the fixing position to the pivoting position, this being recognized by the evaluation unit 358 on the basis of the acceleration values BEW in the X direction detected by the sensors 352 and 354.

Figure 23:
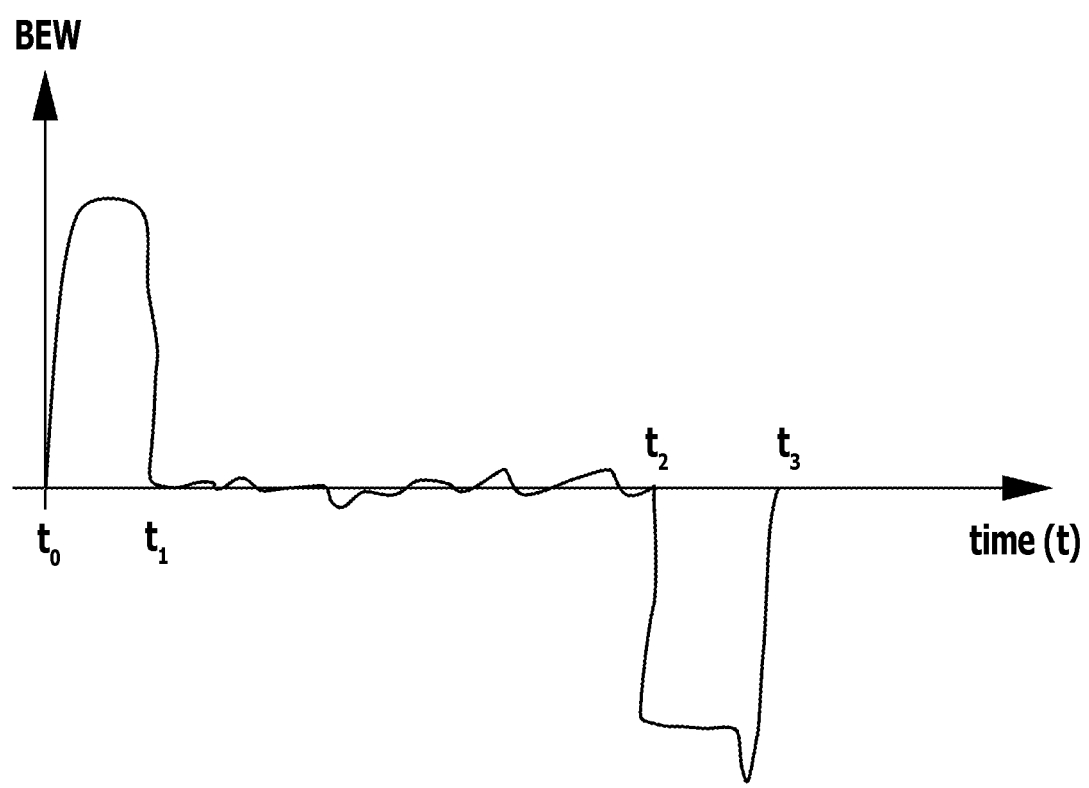
FIG. 23 shows a schematic representation of a course pattern analysis for detecting a translatory movement.

By way of example, as illustrated in FIG. 23, at time $t_0$, when the fixing position is exited, a positive acceleration value BEW1 occurs which at time $t_1$, when an approximately constant translational speed is reached, drops essentially to zero until at time $t_2$, short of reaching the pivoting position defined by a stop, the controller 340 slows down the translatory movement by negative acceleration so that at time $t_3$ only a small further negative acceleration peak occurs upon striking the stop which predetermines the pivoting position.

The evaluation unit 358 evaluates the occurrence and course of the acceleration values BEW over time t by way of a course pattern analysis and is thereby capable of determining, on the basis of, for example, the size and the sign of the acceleration values BEW in conjunction with the times t at which they occur and, for example, comparison thereof with a stored course pattern, whether the ball neck carrier 80 together with the ball neck 40 has been moved over a distance corresponding to the distance between the fixing position and the pivoting position, and in particular whether the stop that defines the pivoting position has been reached.

The same procedure using a course pattern analysis can also be used for monitoring the translational movement from the pivoting position to the fixing position.

If it is determined in the course pattern analysis that the acceleration values BEW and the times t at which they occur deviate significantly from the stored course pattern, then the controller 340 recognizes that either the pivoting position or the fixing position has not been reached and, consequently, that a disturbance exists.

Thus, for example for the position information SI indicating that the pivoting position has been reached, the controller 340 can stop the actuating motor 324 shortly before the pivoting position is reached and return the actuating motor 324 to the starting position after the pivoting of the ball neck carrier 80 begins.

As soon as the freewheeling position is reached, by switching on the pivoting motor 334 by the controller 340, the ball neck carrier 80 together with the ball neck 40 is pivoted about the pivot axis 50, this being recognizable to the controller 340 on the basis of the position information SI, also generated by the sensor system 350, wherein it is recognizable from the for example constant rotary movement relation that drive is imparted to the pivotal movement.

Furthermore, it is recognizable from the position information SI that the ball neck carrier 80 together with the ball neck 40 exits the one final position, i.e., for example, the operating position A, and moves in a direction of the second final position, for example the rest position R, and it is further recognizable from the position information SI whether or not a pivotal movement has been performed through a pivot angle that corresponds to the pivot angle between the one final position and the other final position so that, via the position information SI, it is recognizable on the part of the controller 340 that the other final position has been reached.

When the final position is reached, the pivoting motor 334 is switched off and the pivot bearing body 82 performs a translatory movement from the pivoting position to the fixing position which is detected by the sensors 352 and 354 by, for example, the described course pattern analysis and, furthermore, the locking unit 180 transitions from the releasing position to the clamping position.

In like manner, in the pivoting mode of operation SBM, the reverse pivoting operation, from the final position that has been reached and blocked by the locking unit 180 to the respective other final position, is carried out.

However, the first sensor 352 can also be used as an acceleration sensor for the detection of the pivotal movement because this, when a pivotal movement about the pivot axis 50 occurs, detects accelerations in its YZ plane and the acceleration signals generated thereby can be utilized, on their own or in addition to the inclination signals of the first sensor 352, for determining the position information by way of the evaluation unit 358.

Furthermore, the sensor 354 can additionally be used for detecting longitudinal accelerations in the X direction of the vehicle and transverse accelerations in the Y direction of the vehicle and vertical accelerations in the Z direction of the vehicle in order, for example, to obtain vehicle dynamics information when in travel mode.

Figure 22:
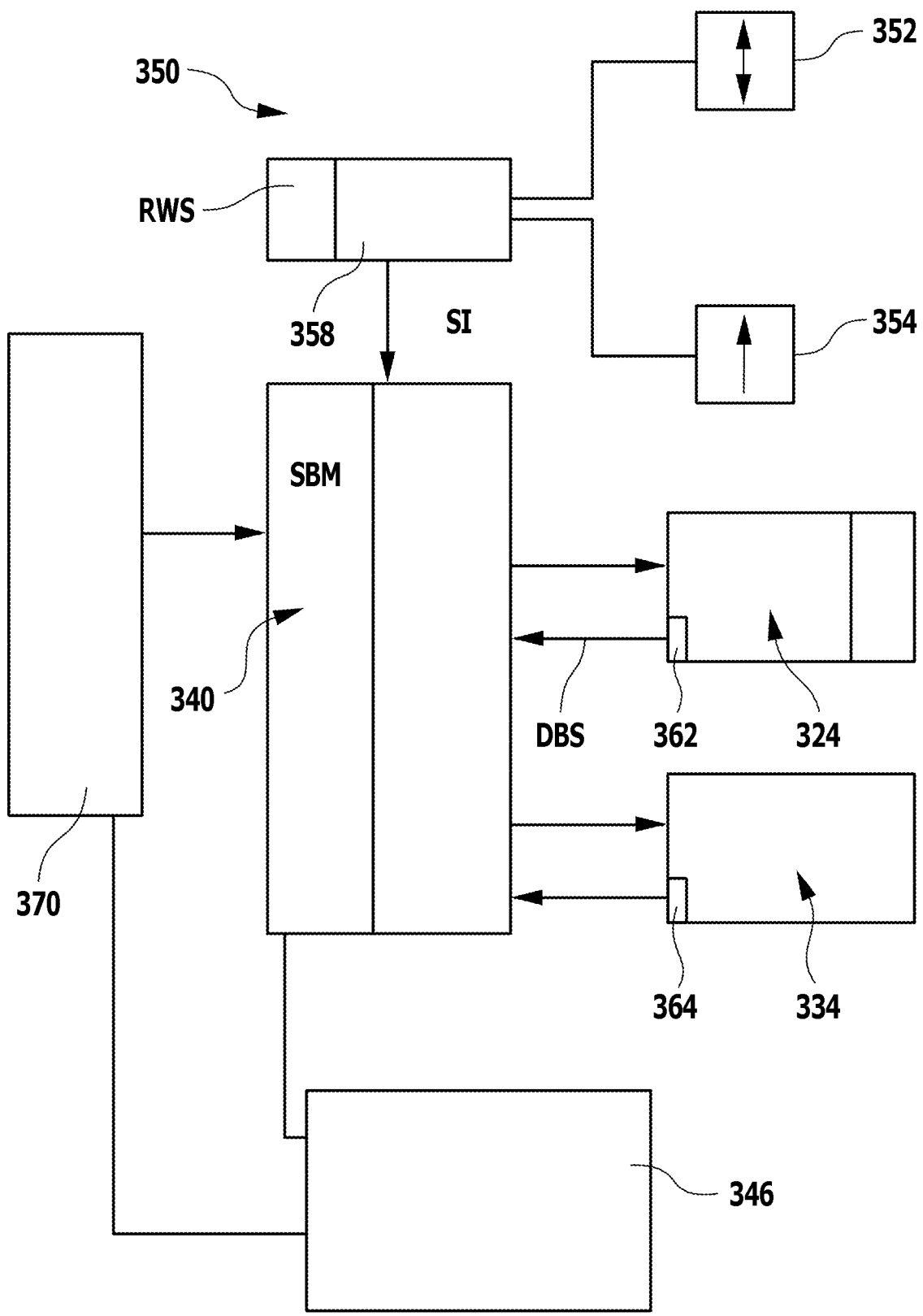
FIG. 22 shows a schematic representation of the sensor system including a motion controller and a sequence controller.

As exemplified in FIG. 22, in the exemplary embodiment described, it is advantageously possible for the position information SI to be evaluated to the effect that the location of the ball neck 40 relative to the bearing unit 30 can be visualized with the aid of a visualization unit 346 so that an operator can track the movement of the ball neck 40 from the operating position A to the rest position R or vice versa.

Furthermore, the visualization unit 346 can be advantageously used to indicate operating modes and/or operating states and/or disturbances associated with the sequence controller 370 and/or the controller 340 and/or the actuating motor 324 and/or the pivoting motor 334 and the locking unit.

This is particularly advantageous when disturbances occur in the course of movements because it enables an operator to view what type of disturbance has occurred.

The invention claimed is:

1. Trailer hitch, comprising:
   a bearing unit mountable, by way of a mounting unit, on a rear end portion of a vehicle body, in fixed relation to the vehicle, said bearing unit having a bearing base and a ball neck carrier supported for movement on the bearing base, and further comprising a ball neck which at a first end is fixedly connected to the ball neck carrier and at a second end carries a hitch ball and which is movable, by the movement of the ball neck carrier relative to the bearing base, between two final positions, one of which is an operating position in which the ball neck extends substantially in a vertical longitudinal center plane of the trailer hitch which, particularly in the state of being mounted to the vehicle body, is coincident with a vertical vehicle longitudinal center plane of the vehicle body, and the other one of which is a rest position in which the ball neck extends transversely with respect to the vertical longitudinal center plane of the trailer hitch; and a sensor system is provided for detecting the position of the ball neck relative to the bearing base, which sensor system detects the positions of the ball neck relative to the bearing base mounted in fixed relation to the vehicle and generates position information concerning a rotary movement about a pivot axis representative of the respective position of the ball neck, wherein at least one rotational position is detected by the sensor system during the rotary movement, the at least one rotational position being an unambiguous rotational position.

2. Trailer hitch as defined in claim 1, wherein the sensor system detects the at least one rotational position within at least one position range of the ball neck which encompasses the operating position and the rest position.

3. Trailer hitch as defined in claim 2, wherein the sensor system detects a plurality of intermediate rotational positions of the ball neck lying between the operating position and the rest position, the at least one rotational position being one of the intermediate rotational positions.

4. Trailer hitch as defined in claim 1, wherein the sensor system comprises an evaluation unit which compares the positions of the ball neck detected by at least one sensor of the sensor system with reference positions and thereby determines the position information.

5. Trailer hitch as defined in claim 4, wherein the evaluation unit generates the position information that provides unambiguous indication of the operating position and the rest position of the ball neck.

6. Trailer hitch as defined in claim 4, wherein the motion controller has associated therewith a visualization unit for indicating operating modes and/or operating states and/or disturbances.

7. Trailer hitch as defined in claim 1, wherein the trailer hitch comprises at least one motorized drive unit for performing the movement of the ball neck and a motion controller which cooperates with a evaluation unit and makes use of the position information for controlling the at least one drive unit and wherein the motion controller controls the drive unit taking into account the position information.

8. Trailer hitch as defined in claim 7, wherein the motion controller comprises a movement mode of operation in which the ball neck is moved from one of the final positions to the other final position.

9. Trailer hitch as defined in claim 8, wherein the motion controller in the movement mode of operation switches off a drive motor, driving the movement, of the at least one drive unit when the respective final position is reached as the conclusion of a process of entry into this final position.

10. Trailer hitch as defined in claim 7, wherein the motion controller in the movement mode of operation, in the course of moving the ball neck from one final position to the other final position, controls the drive unit in such a manner that same moves the ball neck with a defined speed profile.

11. Trailer hitch as defined in claim 10, wherein the defined speed profile for the movement of the ball neck between the final positions comprises a constant speed movement phase.

12. Trailer hitch as defined in claim 7, wherein the motion controller monitors the movement of the ball neck and/or blocking of the movement by comparing the position information of the ball neck with a rotary movement signal of a drive motor of the at least one drive unit.

13. Trailer hitch as defined in claim 1, wherein the trailer hitch comprises a blocking device for fixing the ball neck in the final positions and wherein the blocking device is transferable from a blocking position to a release position by a drive unit and wherein the motion controller which cooperates with the evaluation unit and makes use of the position information is provided for controlling the drive unit taking into account the position information.

14. Trailer hitch as defined in claim 13, wherein the motion controller in a movement mode of operation controls the drive unit in such a manner that the drive unit transfers the blocking device from the blocking position to the release position at the beginning of the movement.

15. Trailer hitch as defined in claim 13, wherein the motion controller in a movement mode of operation controls the drive unit in such a manner that the blocking device transitions to the blocking position no later than when the next following final position is reached.

16. Trailer hitch as defined in claim 15, wherein the motion controller in the pivoting mode of operation, by controlling the drive unit, moves the blocking device to the blocking position when the next following final position is reached.

17. Trailer hitch as defined in claim 15, wherein the motion controller in a movement mode of operation, during the movement of the ball neck between the final positions, moves the blocking device to a blocking standby position from which the blocking device transitions to the blocking position automatically.

18. Trailer hitch as defined in claim 1, wherein the sensor system comprises a first sensor which is arranged for co-pivotal movement with the ball neck carrier or the ball neck and comprises an evaluation unit connected to the first sensor, which evaluation unit, for determining the position of the ball neck, compares sensor signals of the first sensor with reference values associated with the respective position and thereby generates the position information for the ball neck.

19. Trailer hitch as defined in claim 18, wherein the sensor system comprises a second sensor fixedly connected to the bearing base and wherein the evaluation unit is connected to the first sensor and the second sensor and detects the difference values between the first sensor and the second sensor and, for determining the position of the ball neck, compares these with stored reference values for the difference values associated with the respective position and thereby generates the position information for the ball neck.

20. Trailer hitch as defined in claim 19, wherein the evaluation unit detects accelerations with both sensors.

21. Trailer hitch as defined in claim 18, wherein the first sensor and the second sensor are inclination sensors.

22. Trailer hitch as defined in claim 21, wherein the first sensor and the second sensor are configured as sensors operable as inclination sensors detecting movements in space, for example acceleration sensors.

23. Trailer hitch as defined in claim 21, wherein the first and/or the second sensor detect inclinations about at least one inclination axis.

24. Trailer hitch as defined in claim 23, wherein the sensors detect inclination values with respect to a direction of gravity.

25. Trailer hitch as defined in claim 21, wherein the evaluation unit, for determining the position information of the ball neck, detects inclination difference values which are formed from inclination values as measuring values of the sensors.

26. Trailer hitch as defined in claim 18, wherein by the detection of the inclination values of at least the first sensor, at least rotary movements of the ball neck carrier relative to the bearing base about at least one pivot axis are detected.

27. Trailer hitch as defined in claim 18, wherein the first sensor has its Z axis, which is relevant for inclination detection, and a further axis of its Cartesian coordinate system oriented in parallel relation to the pivoting plane.

28. Trailer hitch as defined in claim 18, wherein the evaluation unit detects accelerations with the first sensor.

29. Trailer hitch as defined in claim 1, wherein the sensor system additionally generates position information concerning translatory movement in a direction of the pivot axis.

30. Trailer hitch as defined in claim 1, wherein the detected at least one rotational position deviates from actual rotational position by less than 5 degrees.

31. Trailer hitch, comprising:
a bearing unit mountable, by way of a mounting unit, on a rear end portion of a vehicle body, in fixed relation to the vehicle, said bearing unit having a bearing base and a ball neck carrier supported for movement on the bearing base, and further comprising a ball neck which at a first end is fixedly connected to the ball neck carrier and at a second end carries a hitch ball and which is movable, by the movement of the ball neck carrier relative to the bearing base, between two final positions, one of which is an operating position in which the ball neck extends substantially in a vertical longitudinal center place of the trailer hitch which particularly in the state of being mounted to the vehicle body, is a coincident with a vertical vehicle longitudinal center plane on the vehicle body, and the other one of which is a rest position in which the ball neck extends transversely with respect to the vertical longitudinal center plane of the trailer hitch; and
a sensor system is provided for detecting the position of the ball neck relative to the bearing base, which sensor system detects the positions of the ball neck relative to the bearing base mounted in a fixed relation to the vehicle and generates position information concerning a rotary movement about a pivot axis representative of the respective position of the ball neck, wherein the sensor system detects the positions of the ball neck from the operating position to the rest position and vice versa.

32. Trailer hitch, comprising:
a bearing unit mountable, by way of a mounting unit, on a rear end portion of a vehicle body, in fixed relation to the vehicle, said bearing unit having a bearing base and a ball neck carrier supported for movement on the bearing base, and further comprising a ball neck which at a first end is fixedly connected to the ball neck carrier and at a second end carries a hitch ball and which is movable, by the movement of the ball neck carrier relative to the bearing base, between two final positions, one of which is an operating position in which the ball neck extends substantially in a vertical longitudinal center place of the trailer hitch which particularly in the state of being mounted to the vehicle body, is a coincident with a vertical vehicle longitudinal center plane on the vehicle body, and the other one of which is a rest position in which the ball neck extends transversely with respect to the vertical longitudinal center plane of the trailer hitch; and
a sensor system is provided for detecting the position of the ball neck relative to the bearing base, which sensor system detects the positions of the ball neck relative to the bearing base mounted in a fixed relation to the vehicle and generates position information concerning a rotary movement about a pivot axis representative of the respective position of the ball neck, wherein the sensor system detects the positions of the hitch ball of the ball neck with a spatial resolution less than 5 mm.

33. Trailer hitch, comprising:
a bearing unit mountable, by way of a mounting unit, on a rear end portion of a vehicle body, in fixed relation to the vehicle, said bearing unit having a bearing base and a ball neck carrier supported for movement on the bearing base, and further comprising a ball neck which at a first end is fixedly connected to the ball neck carrier and at a second end carries a hitch ball and which is movable, by the movement of the ball neck carrier relative to the bearing base, between two final positions, one of which is an operating position in which the ball neck extends substantially in a vertical longitudinal center place of the trailer hitch which particularly in the state of being mounted to the vehicle body, is a coincident with a vertical vehicle longitudinal center plane on the vehicle body, and the other one of which is a rest position in which the ball neck extends transversely with respect to the vertical longitudinal center plane of the trailer hitch;
a sensor system is provided for detecting the position of the ball neck relative to the bearing base, which sensor system detects the positions of the ball neck relative to the bearing base mounted in a fixed relation to the vehicle and generates position information concerning a rotary movement about a pivot axis representative of the respective position of the ball neck; and
wherein the sensor system comprises an evaluation unit which compares the positions of the ball neck detected by at least one sensor of the sensor system with reference positions and thereby determines the position information, wherein the evaluation unit generates the position information that provides unambiguous indication of intermediate positions of the ball neck lying between the final positions.

34. Trailer hitch, comprising:
a bearing unit mountable, by way of a mounting unit, on a rear end portion of a vehicle body, in fixed relation to the vehicle, said bearing unit having a bearing base and a ball neck carrier supported for movement on the bearing base, and further comprising a ball neck which at a first end is fixedly connected to the ball neck carrier and at a second end carries a hitch ball and which is movable, by the movement of the ball neck carrier relative to the bearing base, between two final positions, one of which is an operating position in which the ball neck extends substantially in a vertical longitudinal center place of the trailer hitch which particularly in the state of being mounted to the vehicle body, is a coincident with a vertical vehicle longitudinal center plane on the vehicle body, and the other one of which is a rest position in which the ball neck extends transversely with respect to the vertical longitudinal center plane of the trailer hitch; and a sensor system is provided for detecting the position of the ball neck relative to the bearing base, which sensor system detects the positions of the ball neck relative to the bearing base mounted in a fixed relation to the vehicle and generates position information concerning a rotary movement about a pivot axis representative of the respective position of the ball neck; and wherein the trailer hitch comprises at least one motorized drive unit for performing the movement of the ball neck and a motion controller which cooperates with an evaluation unit and makes use of the position information for controlling the at least one drive unit and wherein the motion controller controls the drive unit taking into account the position information, wherein the motion controller in the movement mode of operation, in the course of moving the ball neck from one final position to the other final position, controls the drive unit in such a manner that same moves the ball neck with a defined speed profile, wherein the defined speed profile comprises acceleration phases and deceleration phases associated with the final positions.

35. Trailer hitch, comprising:

a bearing unit mountable, by way of a mounting unit, on a rear end portion of a vehicle body, in fixed relation to the vehicle, said bearing unit having a bearing base and a ball neck carrier supported for movement on the bearing base, and further comprising a ball neck which at a first end is fixedly connected to the ball neck carrier and at a second end carries a hitch ball and which is movable, by the movement of the ball neck carrier relative to the bearing base, between two final positions, one of which is an operating position in which the ball neck extends substantially in a vertical longitudinal center place of the trailer hitch which particularly in the state of being mounted to the vehicle body, is a coincident with a vertical vehicle longitudinal center plane on the vehicle body, and the other one of which is a rest position in which the ball neck extends transversely with respect to the vertical longitudinal center plane of the trailer hitch;

a sensor system is provided for detecting the position of the ball neck relative to the bearing base, which sensor system detects the positions of the ball neck relative to the bearing base mounted in a fixed relation to the vehicle and generates position information concerning a rotary movement about a pivot axis representative of the respective position of the ball neck; and wherein the trailer hitch comprises at least one motorized drive unit for performing the movement of the ball neck and a motion controller which cooperates with an evaluation unit and makes use of the position information for controlling the at least one drive unit and wherein the motion controller controls the drive unit taking into account the position information, wherein the motion controller monitors the movement of the ball neck and/or blocking of the movement by comparing the position information of the ball neck with a rotatory movement signal of a drive motor of the at least one drive unit, wherein the motion controller, by comparing the position information of the ball neck with the rotary movement signal of the drive motor, determines a movement relationship and compares this with stored reference values for the movement relationship.

36. Trailer hitch as defined in claim 35, wherein the motion controller generates a fault signal if the determined movement relationship deviates from the predetermined movement relationship.

37. Trailer hitch, comprising:

a bearing unit mountable, by way of a mounting unit, on a rear end portion of a vehicle body, in fixed relation to the vehicle, said bearing unit having a bearing base and a ball neck carrier supported for movement on the bearing base, and further comprising a ball neck which at a first end is fixedly connected to the ball neck carrier and at a second end carries a hitch ball and which is movable, by the movement of the ball neck carrier relative to the bearing base, between two final positions, one of which is an operating position in which the ball neck extends substantially in a vertical longitudinal center place of the trailer hitch which particularly in the state of being mounted to the vehicle body, is a coincident with a vertical vehicle longitudinal center plane on the vehicle body, and the other one of which is a rest position in which the ball neck extends transversely with respect to the vertical longitudinal center plane of the trailer hitch; and a sensor system is provided for detecting the position of the ball neck relative to the bearing base, which sensor system detects the positions of the ball neck relative to the bearing base mounted in a fixed relation to the vehicle and generates position information concerning a rotary movement about a pivot axis representative of the respective position of the ball neck;

wherein the sensor system comprises a first sensor which is arranged for co-pivotal movement with the ball neck carrier or the ball neck and comprises an evaluation unit connected to the first sensor, which evaluation unit, for determining the position of the ball neck, compares sensor signals of the first sensor with reference values associated with the respective position and thereby generates the position information for the ball neck, wherein the sensor system comprises a second sensor fixedly connected to the bearing base and wherein the evaluation unit is connected to the first sensor and the second sensor and detects the difference values between the first sensor and the second sensor and, for determining the position of the ball neck, compares these with stored reference values for the difference values associated with the respective position and thereby generates the position information for the ball neck; and wherein the evaluation unit detects an inclination difference between an inclination of the first sensor and an inclination of the second sensor in at least one of the final positions.

38. Trailer hitch as defined in claim 37, wherein for determining the position information of the ball neck based on the determined inclination difference, the course of the inclination values of the first sensor is determined in a movement from one final position to the other final position.

39. Trailer hitch, comprising:

a bearing unit mountable, by way of a mounting unit, on a rear end portion of a vehicle body, in fixed relation to the vehicle, said bearing unit having a bearing base and a ball neck carrier supported for movement on the bearing base, and further comprising a ball neck which at a first end is fixedly connected to the ball neck carrier and at a second end carries a hitch ball and which is movable, by the movement of the ball neck carrier relative to the bearing base, between two final positions, one of which is an operating position in which the ball neck extends substantially in a vertical longitudinal center place of the trailer hitch which particularly in the state of being mounted to the vehicle body, is a coincident with a vertical vehicle longitudinal center plane on the vehicle body, and the other one of which is a rest position in which the ball neck extends transversely with respect to the vertical longitudinal center plane of the trailer hitch; and a sensor system is provided for detecting the position of the ball neck relative to the bearing base, which sensor system detects the positions of the ball neck relative to the bearing base mounted in a fixed relation to the vehicle and generates position information concerning a rotary movement about a pivot axis representative of the respective position of the ball neck; and wherein the sensor system comprises a first sensor which is arranged for co-pivotal movement with the ball neck carrier or the ball neck and comprises an evaluation unit connected to the first sensor, which evaluation unit, for determining the position of the ball neck, compares sensor signals of the first sensor with reference values associated with the respective position and thereby generates the position information for the ball neck, wherein the sensor system comprises a second sensor fixedly connected to the bearing base and wherein the evaluation unit is connected to the first sensor and the second sensor and detects the difference values between the first sensor and the second sensor and, for determining the position of the ball neck, compares these with stored reference values for the difference values associated with the respective position and thereby generates the position information for the ball neck; and wherein the second sensor has its Z axis, which is relevant for inclination detection, and a further axis of its Cartesian coordinate system oriented in parallel relation to the pivoting plane.

40. Trailer hitch, comprising:

a bearing unit mountable, by way of a mounting unit, on a rear end portion of a vehicle body, in fixed relation to the vehicle, said bearing unit having a bearing base and a ball neck carrier supported for movement on the bearing base, and further comprising a ball neck which at a first end is fixedly connected to the ball neck carrier and at a second end carries a hitch ball and which is movable, by the movement of the ball neck carrier relative to the bearing base, between two final positions, one of which is an operating position in which the ball neck extends substantially in a vertical longitudinal center place of the trailer hitch which particularly in the state of being mounted to the vehicle body, is a coincident with a vertical vehicle longitudinal center plane on the vehicle body, and the other one of which is a rest position in which the ball neck extends transversely with respect to the vertical longitudinal center plane of the trailer hitch; and a sensor system is provided for detecting the position of the ball neck relative to the bearing base, which sensor system detects the positions of the ball neck relative to the bearing base mounted in a fixed relation to the vehicle and generates position information concerning a rotary movement about a pivot axis representative of the respective position of the ball neck;

wherein the sensor system comprises a first sensor which is arranged for co-pivotal movement with the ball neck carrier or the ball neck and comprises an evaluation unit connected to the first sensor, which evaluation unit, for determining the position of the ball neck, compares sensor signals of the first sensor with reference values associated with the respective position and thereby generates the position information for the ball neck, wherein the sensor system comprises a second sensor fixedly connected to the bearing base and wherein the evaluation unit is connected to the first sensor and the second sensor and detects the difference values between the first sensor and the second sensor and, for determining the position of the ball neck, compares these with stored reference values for the difference values associated with the respective position and thereby generates the position information for the ball neck; and wherein the evaluation unit detects accelerations with both sensors, wherein the evaluation unit detects an acceleration difference between the first sensor and the second sensor and detects a rotary and/or translatory movement by determining difference values by comparing these with reference value.

41. Trailer hitch, comprising:

a bearing unit mountable, by way of a mounting unit, on a rear end portion of a vehicle body, in fixed relation to the vehicle, said bearing unit having a bearing base and a ball neck carrier supported for movement on the bearing base, and further comprising a ball neck which at a first end is fixedly connected to the ball neck carrier and at a second end carries a hitch ball and which is movable, by the movement of the ball neck carrier relative to the bearing base, between two final positions, one of which is an operating position in which the ball neck extends substantially in a vertical longitudinal center place of the trailer hitch which particularly in the state of being mounted to the vehicle body, is a coincident with a vertical vehicle longitudinal center plane on the vehicle body, and the other one of which is a rest position in which the ball neck extends transversely with respect to the vertical longitudinal center plane of the trailer hitch; and a sensor system is provided for detecting the position of the ball neck relative to the bearing base, which sensor system detects the positions of the ball neck relative to the bearing base mounted in a fixed relation to the vehicle and generates position information concerning a rotary movement about a pivot axis representative of the respective position of the ball neck;

wherein the sensor system comprises an evaluation unit which compares the positions of the ball neck detected by at least one sensor of the sensor system with reference positions and thereby determines the position information, wherein the evaluation unit detects translatory movements by a course pattern analysis of acceleration values.

* * * * *